(12) United States Patent
Tsutsui et al.

(10) Patent No.: US 10,355,625 B2
(45) Date of Patent: Jul. 16, 2019

(54) DC BRUSHLESS MOTOR AND METHOD FOR CONTROLLING THE SAME

(75) Inventors: Akira Tsutsui, Kobe (JP); Kenichi Inoue, Kobe (JP); Kyoji Zaitsu, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 680 days.

(21) Appl. No.: 13/989,010

(22) PCT Filed: Nov. 18, 2011

(86) PCT No.: PCT/JP2011/006433
§ 371 (c)(1),
(2), (4) Date: May 22, 2013

(87) PCT Pub. No.: WO2012/073446
PCT Pub. Date: Jun. 7, 2012

(65) Prior Publication Data
US 2013/0234540 A1    Sep. 12, 2013

(30) Foreign Application Priority Data

Dec. 1, 2010  (JP) ................................. 2010-268396

(51) Int. Cl.
*H02P 6/08*     (2016.01)
*H02K 1/02*    (2006.01)
(Continued)

(52) U.S. Cl.
CPC ............... *H02P 6/08* (2013.01); *H02K 1/02* (2013.01); *H02K 1/145* (2013.01); *H02K 19/103* (2013.01)

(58) Field of Classification Search
CPC .. H02K 1/02; H02K 1/16; H02K 1/14; H02K 1/141; H02K 1/143; H02K 1/148;
(Continued)

(56) References Cited

U.S. PATENT DOCUMENTS

| 3,950,663 A | 4/1976 | Mead |
| 5,041,748 A * | 8/1991 | Huber ................. F16H 25/2204 192/141 |

(Continued)

FOREIGN PATENT DOCUMENTS

| JP | 2001-057762 A | 2/2001 |
| JP | 2006-333545 A | 12/2006 |

(Continued)

OTHER PUBLICATIONS

Suzuki (JP-U-51-33715, Mar. 12, 1976) English Translation.*
(Continued)

*Primary Examiner* — Quyen P Leung
*Assistant Examiner* — Robert E Mates
(74) *Attorney, Agent, or Firm* — Studebaker & Brackett PC

(57) ABSTRACT

This DC brushless motor (1) is provided with a stator (2) that has exciting coils (31, 32) and a rotor (4) that is positioned coaxially to the stator (2). The stator (2) has a quasi-E-shaped cross-section in the axial direction at the radius part; a plurality of protrusions (212, 222, 232) serving as magnetic poles are formed on the respective 3 parallel sections (211, 221, 231) of the E in the same number in the circumferential direction; and of the magnetic poles (212, 222, 232) formed at the 3 parallel sections (211, 221, 231) of the E, the top and the bottom magnetic poles (212, 232) are respectively positioned so as to be shifted in the opposite directions in the circumferential direction with respect to the center line of the middle magnetic pole (222). Changes in the magnetic resistance between the stator (2) and the rotor (4), which are caused by the flow of a magnetic flux generated around the exciting coils (31, 32), are utilized as a driving force. The DC brushless motor (1) configured in said manner (Continued)

exhibits excellent space efficiency at low cost and is less affected by temperature changes.

8 Claims, 18 Drawing Sheets

(51) Int. Cl.
*H02K 1/14* (2006.01)
*H02K 19/10* (2006.01)

(58) Field of Classification Search
CPC ........ H02K 1/12; H02K 23/40; H02K 19/103; H02K 1/145; F16C 32/0461; F16H 59/105; G04C 13/11; H02P 6/08
USPC ............ 310/44, 216.011, 216.021, 216.022, 310/216.023, 216.024, 216.025, 216.026, 310/216.027, 216.028, 216.029, 216.031, 310/216.035, 181, 112, 165, 269; 318/701, 400.01, 400.42

See application file for complete search history.

(56) References Cited

U.S. PATENT DOCUMENTS

| | | | |
|---|---|---|---|
| 5,403,172 A | 4/1995 | Blass et al. | |
| 5,527,167 A | 6/1996 | Blass et al. | |
| 5,538,408 A | 6/1996 | Blass et al. | |
| 5,942,828 A | 8/1999 | Hill | |
| 6,054,819 A * | 4/2000 | Pengov | H02P 25/092 318/254.2 |
| 6,252,325 B1 * | 6/2001 | Nashiki | H02K 19/103 310/155 |
| 6,600,399 B1 * | 7/2003 | Trandafir | H01F 7/066 335/222 |
| 8,749,105 B2 * | 6/2014 | Arita | H02K 1/145 310/112 |
| 2005/0146304 A1 * | 7/2005 | Ramu | H02K 1/24 318/701 |
| 2006/0006744 A1 * | 1/2006 | Nashiki | H02K 1/145 310/49.37 |
| 2008/0197739 A1 * | 8/2008 | Nashiki | H02K 1/06 310/156.55 |
| 2009/0021089 A1 * | 1/2009 | Nashiki | H02K 21/24 310/46 |
| 2010/0123426 A1 * | 5/2010 | Nashiki | H02K 1/12 318/701 |
| 2011/0070108 A1 | 3/2011 | Arita et al. | |

FOREIGN PATENT DOCUMENTS

| | | | | |
|---|---|---|---|---|
| JP | 2007-032573 A | | 2/2007 | |
| JP | 2009-043776 A | | 2/2009 | |
| JP | 2009-142086 A | | 6/2009 | |
| JP | WO 2009139278 A1 * | | 11/2009 | ............ H02K 1/145 |
| JP | 2010-193700 A | | 9/2010 | |
| JP | U-51-33715 | | 11/2012 | |
| WO | WO 2006/126552 A1 | | 11/2006 | |
| WO | WO 2009/136574 A1 | | 11/2009 | |

OTHER PUBLICATIONS

Office Action from Japanese Patent Office from corresponding Japanese Application No. 2010-268396 dated Feb. 14, 2012.
International Search Report from the International Bureau in corresponding International Application No. PCT/JP2011/006433, dated Feb. 14, 2012, 2 pages and the Written Opinion from the International Bureau, dated Feb. 14, 2012, 5 pages.
Office Action from the Japanese Patent Office, dated Feb. 14, 2012 in corresponding Japanese Patent Application No. 2010-268396, 3 pages in English, 3 pages in Japanese.
The extended European search report issued by the European Patent Office dated Feb. 23, 2016, which corresponds to European Patent Application No. 11845675.5-1808 and is related to U.S. Appl. No. 13/989,010.

* cited by examiner (A)

(B)

(C)

(A)

(B)

(B)

(A)

(B)

(B)

(A)

(B)

DC BRUSHLESS MOTOR AND METHOD FOR CONTROLLING THE SAME

TECHNICAL FIELD

The present invention relates to a DC brushless motor and a method for controlling the DC brushless motor, and mainly relates to a motor that uses a powder magnetic core as an iron core and is driven by one-phase excitation.

BACKGROUND ART

A motor is used in wide fields as a part that converts electric power into motive power, such as automobiles, home-use electrical products, and industrial use. A motor includes a stator that is a non-rotational part, and a rotor that rotates with an output shaft. The stator and the rotor include an electromagnetic coil, a magnet, and an iron core.

Motors are divided into several types in accordance with the principle for generating a driving force and the structure. A motor of one type that uses one permanent magnet is called PM (permanent magnet) motor, and is particularly used in wide fields. The PM motor includes the permanent magnet in a rotor. A rotational force is generated by the interaction between an electromagnetic coil provided in a stator and a magnetic flux generated by the permanent magnet.

Since a motor serves as a power source, the motor is strongly desired to be reduced in size. To reduce the size, the motor has to generate a stronger magnetic force. To obtain the stronger magnetic force, a magnet that generates a strong magnetic flux is required. For example, in PTL 1, a magnet that uses an Nd—Fe—B-based element has been developed (Nd: neodymium, Fe: iron, B: boron). However, such a magnet requires an expensive and rare metal, such as Dy (dysprosium) or Nd. Meanwhile, a strong magnetic force (electromagnetic force) can be obtained even by increasing a magnetic field that is generated by an electromagnetic coil. An effective method thereof may be increasing exciting current, or increasing turns of the electromagnetic coil. However, the former method has a restriction by the sectional area of the coil, and the latter method has a restriction by the space in which the wire is wound. The methods involve limitations.

Hence, in recent years, development of a motor that uses a powder magnetic core for an iron core is being developed. The powder magnetic core is formed by forming an insulating film on the surface of soft magnetic powder, then compacting, and heat processing. A motor hitherto uses a stack magnetic core in which electromagnetic steel sheets are punched and stacked. A magnetic flux hardly passes through the stack magnetic core in a stack direction, and easily passes through the stack magnetic core in a sheet plane direction. Hence, a magnetic circuit has been designed in plane. In contrast, since the above-described powder magnetic core is formed by compacting soft magnetic powder, the powder magnetic core may use a magnetic core material having an isotropic magnetic property and allowing a three-dimensional magnetic circuit to be designed. Also, the powder magnetic core may have a desirable shape by changing the shape of a die for compacting or by machining etc. after the compacting. The three-dimensional magnetic design can provide a variety of motor core shapes. A flat motor or a small motor can be designed.

As a motor that uses the powder magnetic core and is reduced in size, for example, any of PTL 2 to PTL 4 discloses a claw teeth motor that uses a three-dimensional magnetic circuit. While a coil has been conventionally wound around each teeth, according to any of PTL 2 to PTL 4, a ring-shaped coil is arranged inside a claw pole iron core. The disclosed claw teeth motor allows the size to be reduced by increasing the winding density, that is, by increasing the magnetic force. Also, by using the powder magnetic core, driving in an alternating magnetic field is available. If a stator has a three-layer structure with electrical angles being mutually shifted by 120°, the claw teeth motor disclosed in any of PTL 2 to PTL 4 also provides blushless driving in a three-phase alternating magnetic field.

Any of PTL 2 to PTL 4 discloses the claw pole motor using the powder magnetic core. However, the claw pole motor cannot rotate only by a one-phase basic structure. Hence, by stacking a plurality of pieces, a unit with three or more phases has to be formed. However, in the case of three phases, magnetic circuits that contribute to generation of a torque on average correspond to two phases at maximum. Hence, a magnetic circuit for one phase is wasted in view of an output per volume. Also, in the claw pole motor, a rotor requires a permanent magnet. Hence, the cost increases. Also, in the claw pole motor, a demagnetization characteristic with temperature changes has to be considered. Hence, there are restrictions, for example, when a magnet is selected, the shape is designed, and a cooling system is designed.

CITATION LIST

Patent Literature

PTL 1: Japanese Unexamined Patent Application Publication No. 2009-43776
PTL 2: Japanese Unexamined Patent Application Publication No. 2006-333545
PTL 3: Japanese Unexamined Patent Application Publication No. 2007-32573
PTL 4: Japanese Unexamined Patent Application Publication No. 2009-142086

SUMMARY OF INVENTION

The present invention is made in light of the situations, and an object of the present invention is to provide a DC blushless motor and a method for controlling the DC brushless motor, the DC brushless motor which exhibits excellent space efficiency at low cost and is less affected by temperature changes.

A DC brushless motor according to the present invention includes a stator including exciting coils; and a rotor provided coaxially to the stator. The stator has a substantially E-shaped cross-section in an axial direction at a radius part; and a plurality of protrusions, which serve as magnetic poles, are formed in a circumferential direction at each of three parallel sections of the E shape by equivalent numbers. From among the magnetic poles at the three parallel sections of the E shape, the corresponding top and bottom magnetic poles are positioned to be shifted in opposite directions in the circumferential direction with respect to a center line of the corresponding middle magnetic pole. A change in magnetic resistance between the stator and the rotor caused by a flow of a magnetic flux, which is generated around the exciting coils, is utilized as a driving force. The DC brushless motor configured as described above exhibits excellent space efficiency at low cost and is less affected by temperature changes. Also, a method for controlling a DC brushless motor according to the present invention is a method for controlling the above-described DC brushless motor that houses two exciting coils in two recesses of the E shape. The method includes applying plus current to one of the two exciting coils if the rotor is activated in a forward rotation direction; and applying minus current to the other exciting coil if the rotor is activated in a reverse rotation direction that is reverse to the forward rotation direction. Accordingly, the control method configured as described above can activate the DC brushless motor with the above-described configuration.

The above-described object, other objects, features, and advantages of the present invention will become apparent from the following detailed description and the attached drawings.

DESCRIPTION OF EMBODIMENTS

Figure 1:
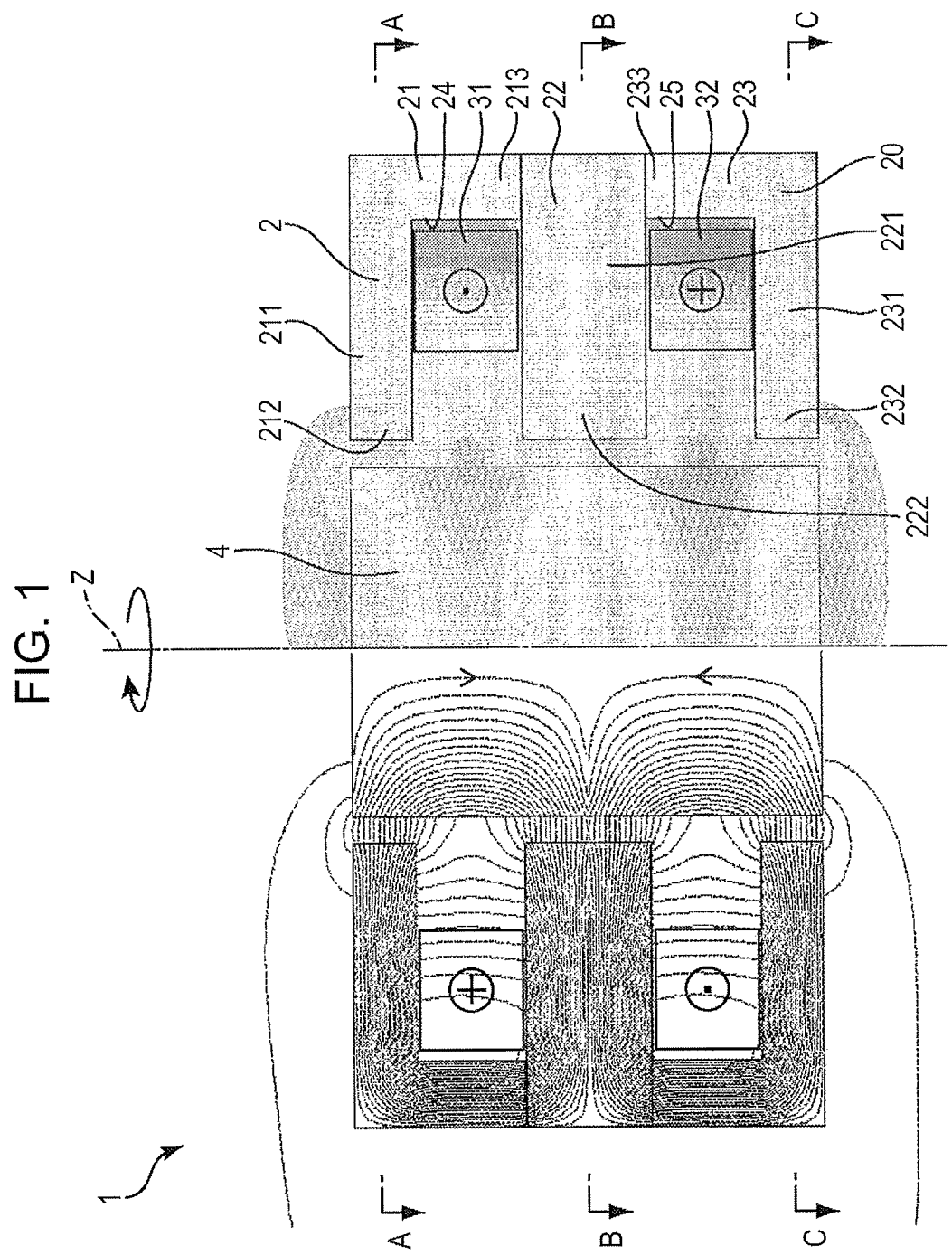
FIG. 1 is a sectional view in the axial direction of a DC brushless motor according to an embodiment.

Embodiments of the present invention are described below with reference to the drawings. Configurations with the same reference sign applied in the drawings are the same configurations, and the redundant description is omitted. Also, in this specification, when configurations are collectively described, a reference sign without an alphabetic character is applied to the configurations. When the configurations are individually described, reference signs with alphabetic characters are applied to the configurations.

First Embodiment

Figure 2:
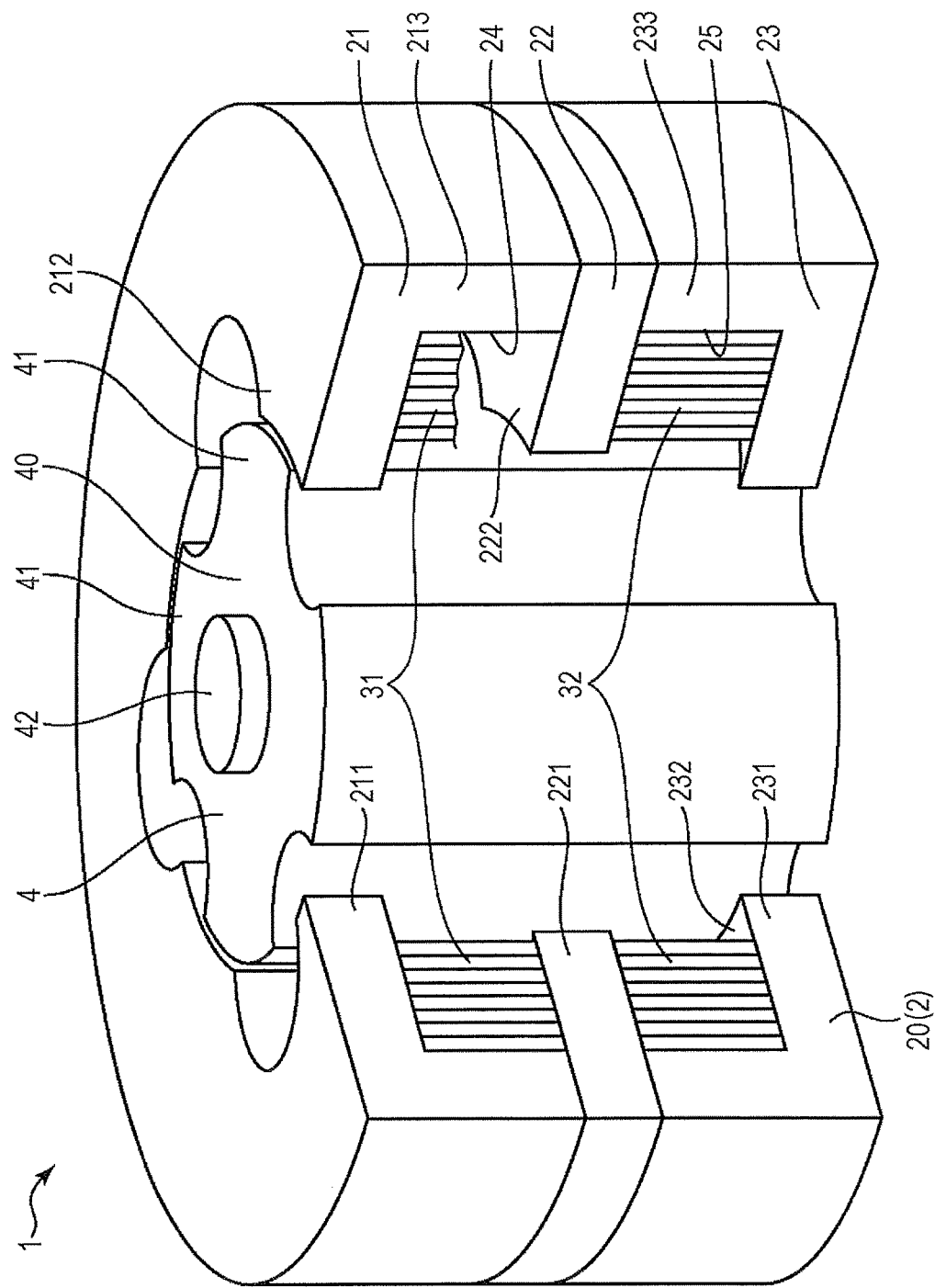
FIG. 2 is a perspective view showing the DC brushless motor shown in FIG. 1 with part thereof cut and removed.
Figure 3:
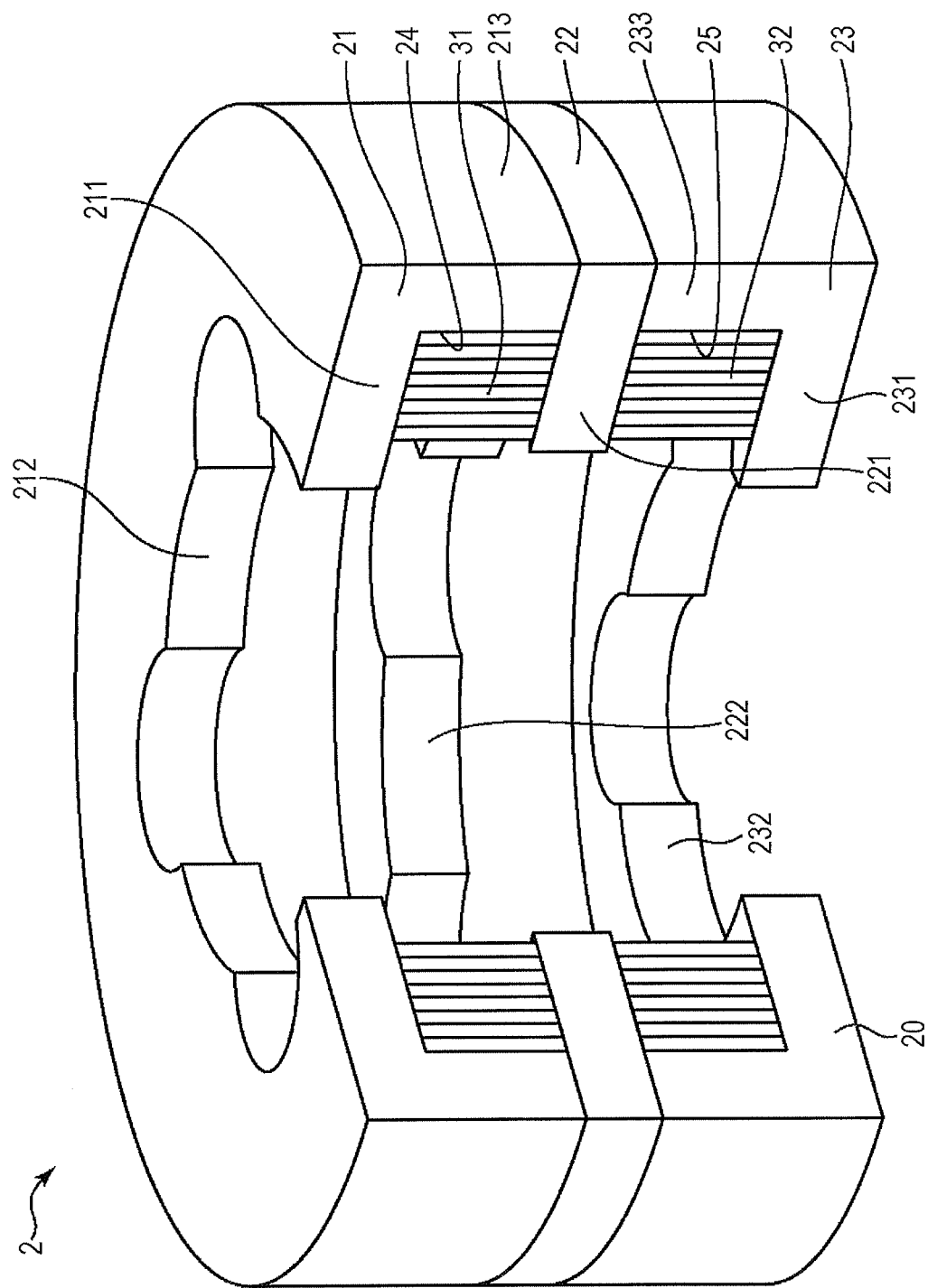
FIG. 3 is a perspective view showing a stator of the DC brushless motor shown in FIG. 1 with part thereof cut and removed.
Figure 4:
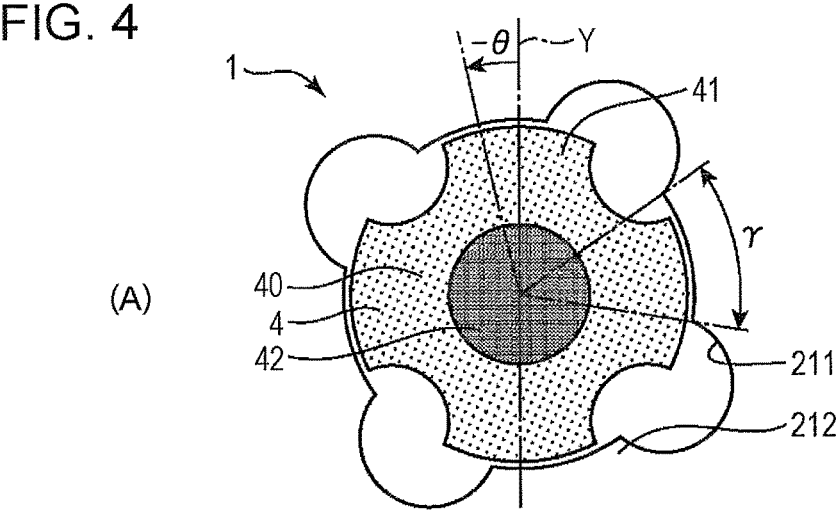
FIG. 4 is a sectional view perpendicular to the axis of the DC brushless motor shown in FIG. 1.
Figure 4:
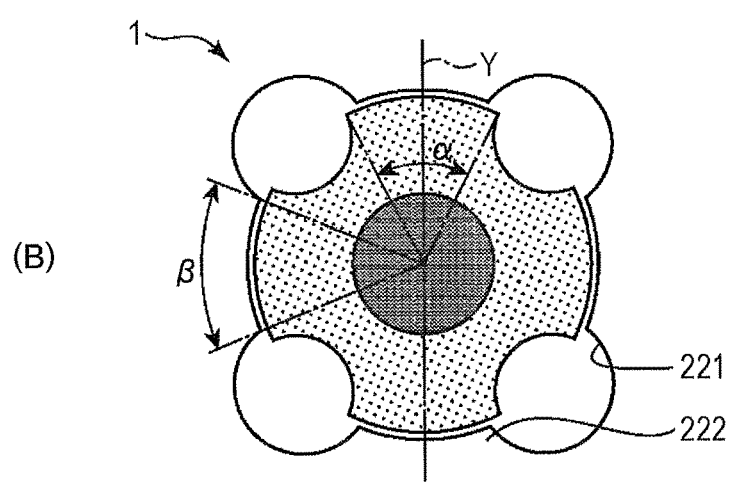
Figure 4:
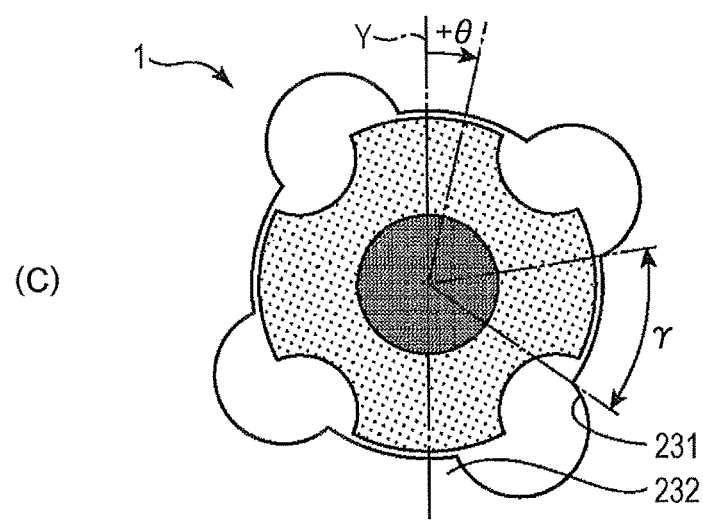
Figure 5:
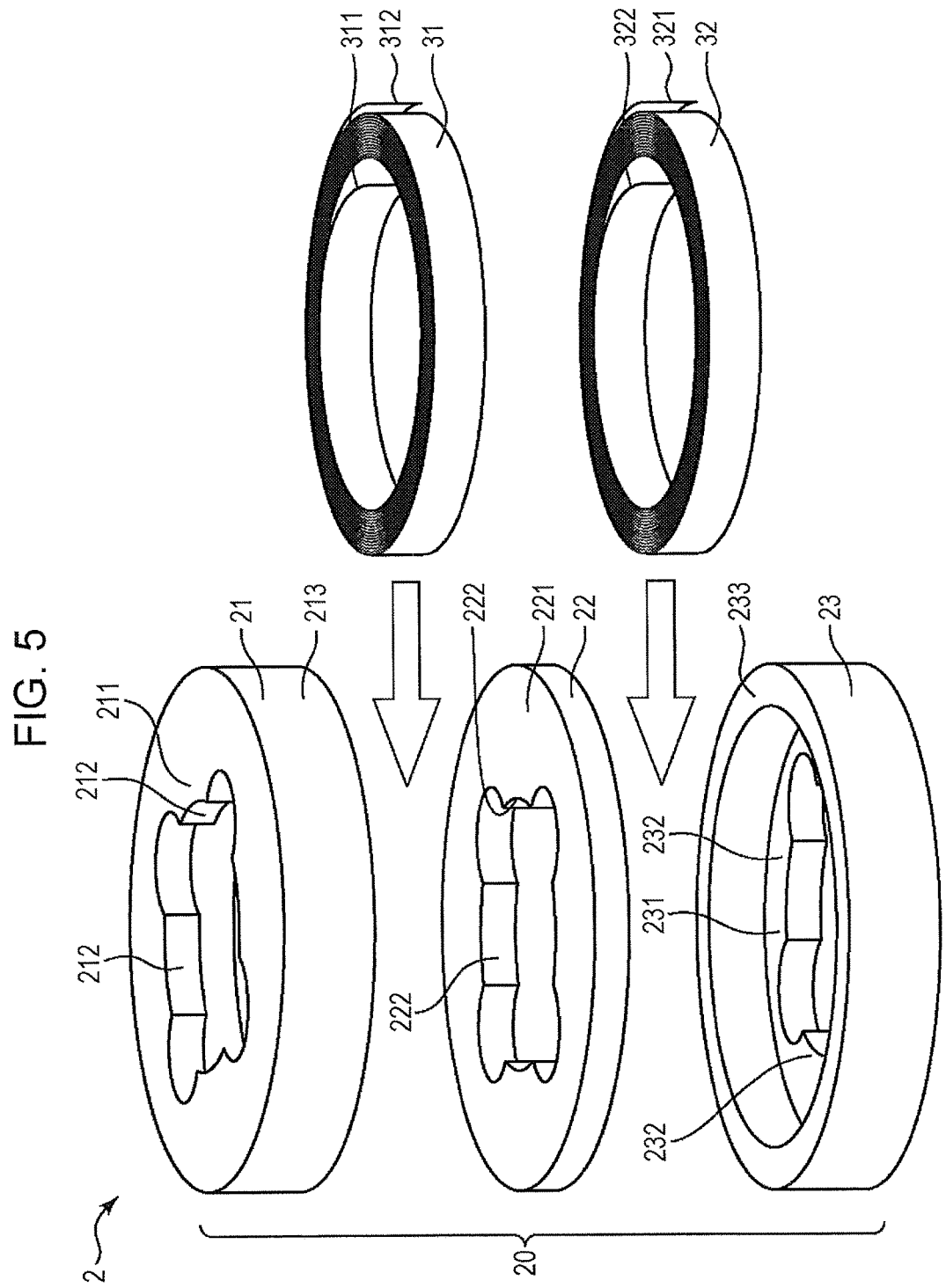
FIG. 5 is an exploded perspective view of the stator of the DC brushless motor shown in FIG. 1.

FIG. 1 is a sectional view in the axial direction of a DC brushless motor 1 according to a first embodiment. FIG. 2 is a perspective view with part of the DC brushless motor 1 cut and removed. FIG. 3 is a perspective view with part of a stator 2 cut and removed. FIGS. 4(A), 4(B), and 4(C) are sectional views perpendicular to the axis, in sectional planes A-A, B-B, and C-C in FIG. 1 of the DC brushless motor. FIG. 5 is an exploded perspective view of the stator 2.

The DC brushless motor 1 mainly includes the stator 2 having two exciting coils 31 and 32, and a rotor 4 that is an inner rotor coaxially provided in the stator 2. The DC brushless motor 1 is a motor that performs SR operation in which a change in magnetic resistance between the stator 2 and the rotor 4 caused by a flow of a magnetic flux generated around the exciting coils 31 and 32 is utilized as a driving force. In the DC brushless motor 1, the exciting coils 31 and 32 have a two-layer structure, and have the following configuration.

First, as shown in FIGS. 1 to 3, and 5, an iron core member 20 of the stator 2 includes members 21, 22, and 23 that are divided into three in the axis Z direction. The iron core member 20 has a substantially E-shaped cross-section in the axis Z direction at a radius part. A plurality of protrusions 212, 222, and 232 serving as magnetic poles are formed on three parallel sections 211, 221, and 231 of the E shape periodically in the circumferential direction as shown in FIG. 4. That is, in the case of such an inner rotor, the iron core member 20 of the stator 2 at the outer periphery side has a shape in which three edges (rings) extend from a cylindrical outer wall toward the inner periphery side. Herein, the numbers of the protrusions (magnetic poles) 212, 222, and 232 are the same. Also, as shown in FIG. 4, the corresponding top and bottom magnetic poles 212 and 232 are positioned to be shifted in the opposite directions by equal angles θ with respect to the center line of the corresponding middle magnetic pole 222.

Also, the ring-shaped exciting coils 31 and 32 are respectively housed in two recesses 24 and 25 of the E shape. Hence, the top and bottom members 21 and 23 each have a substantially L-shaped section in the axis Z direction when the member is developed in the circumferential direction. L-shaped peripheral walls 213 and 233 are closed with the middle member 22, and hence the recesses 24 and 25 are formed. When such a stator 2 is assembled, first, the exciting coils 31 and 32 are respectively housed in the L-shaped portions of the top and bottom members 21 and 23, an adhesive is applied on the peripheral walls 213 and 233, and then the members 21, 22, and 23 are assembled. Alternatively, instead of bonding, the members 21, 22, and 23 may be fastened by bolts. Accordingly, the stator 2 is assembled. Also, the exciting coils 31 and 32 are each formed by winding a strip-shaped conductive member such that the width direction of the strip-shaped conductive member extends along the rotation-axis Z direction of the exciting coils 31 and 32.

Figure 6:
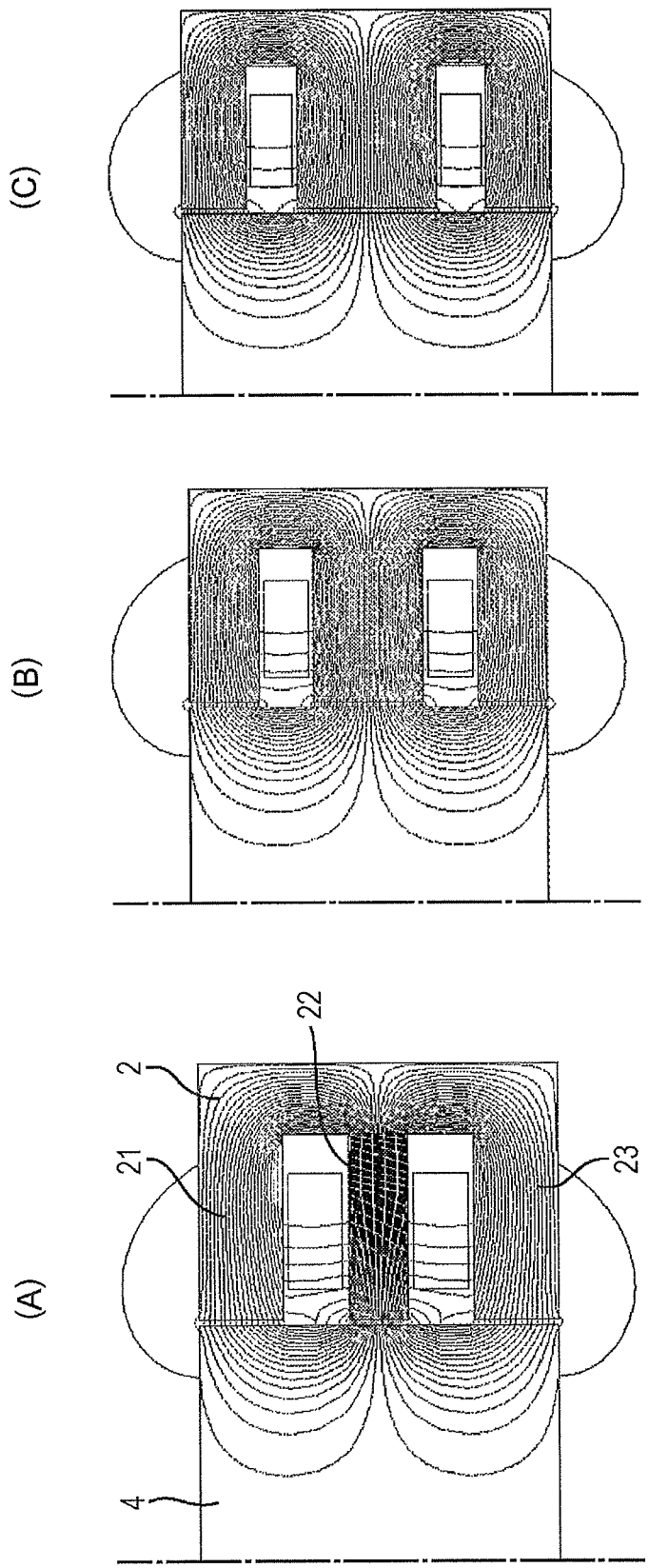
FIG. 6 illustrates a result of magnetic field analysis, and shows flows of a magnetic flux when electricity is applied to an exciting coil of the DC brushless motor shown in FIG. 1.

FIG. 6 illustrates a result of magnetic field analysis showing a flow of a magnetic flux when electricity is applied to the exciting coils 31 and 32 of the DC brushless motor 1. Assuming that the thickness of each of the protrusions (magnetic poles) 212 and 232 of the top and bottom members 21 and 23 is 1, FIG. 6(A) shows a result of the magnetic field analysis if the thickness of the protrusion (magnetic pole) 222 of the middle member 22 is 0.6 times the thickness 1, FIG. 6(B) shows a result of the magnetic field analysis if the thickness is 1.5 times the thickness 1, and FIG. 6(C) shows a result of the magnetic field analysis if the thickness is 1.9 times the thickness 1. As shown in these drawings, since magnetic flux lines from both the top and bottom members 21 and 23 pass through the middle member 22, the density of the magnetic flux lines in the middle member 22 becomes high. Hence, as the thickness of the protrusions (magnetic poles) 222 of the middle member 22 is decreased, the magnetic flux that leaks to the surface of the rotor 4 from positions other than distal ends of the protrusions (magnetic poles) 212, 222, and 232 are increased. Owing to this, the thickness of the protrusions (magnetic poles) 222 of the middle member 22 is preferably at least 1.5 times the thickness of the protrusions (magnetic poles) 212 and 232 of the top and bottom members 21 and 23.

Figure 7:
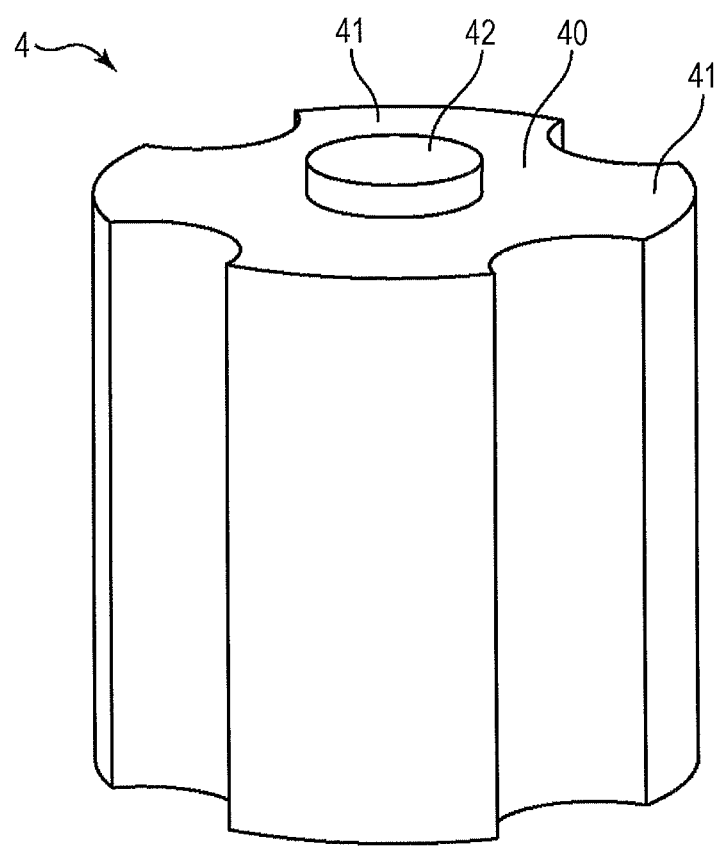
FIG. 7 is a perspective view of a rotor of the DC brushless motor shown in FIG. 1.

As shown in FIG. 7, the rotor 4 is formed of an iron core member 40 having a plurality of protrusions 41, which serve as magnetic poles and are formed periodically in the circumferential direction. An output shaft 42 of the rotor 4 may be a separate member that is press fitted to the iron core member 40, or may be integrally molded with the iron core member 40.

Figure 8:
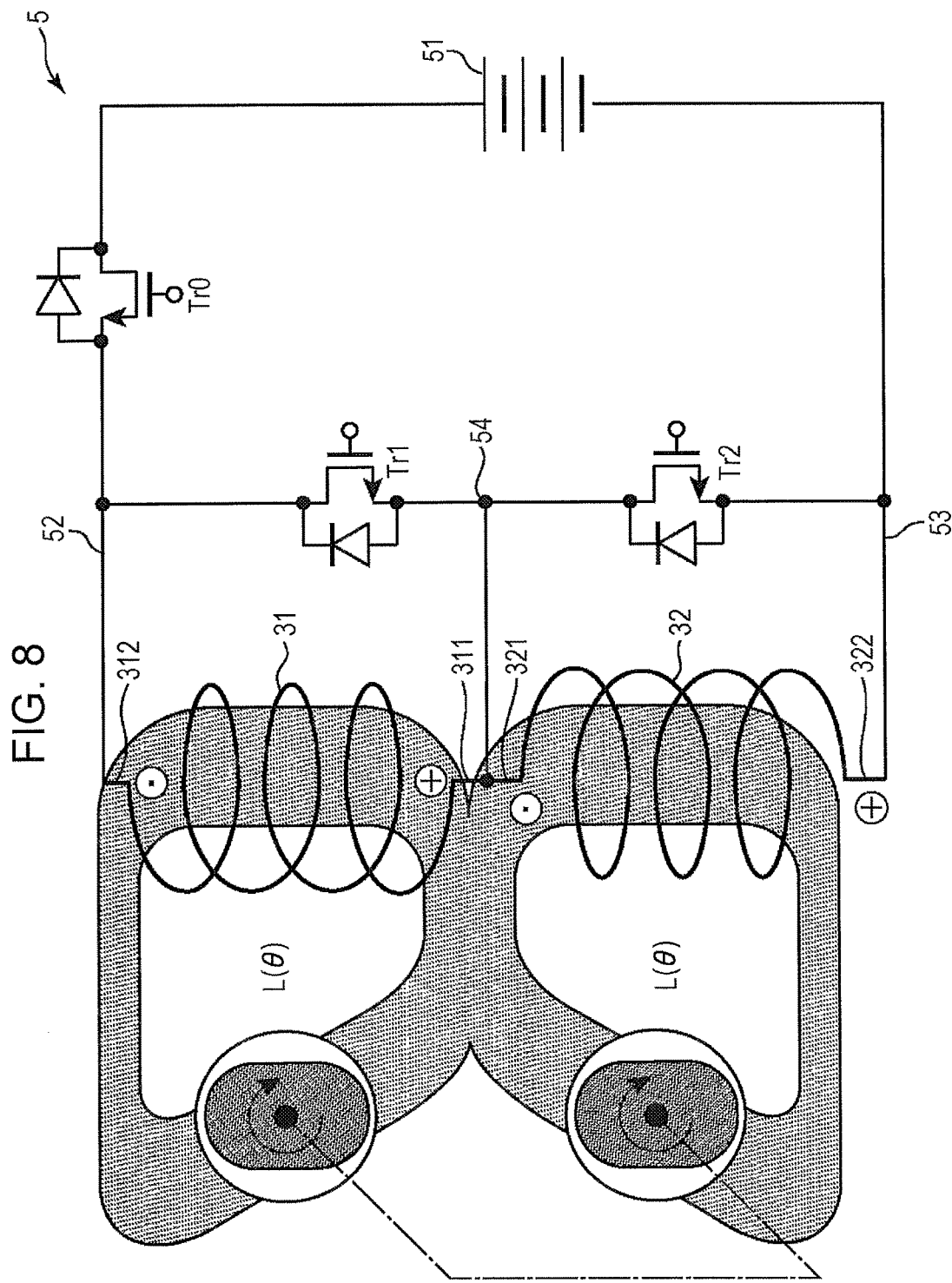
FIG. 8 illustrates an example of a driving circuit of the DC brushless motor shown in FIG. 1.

FIG. 8 illustrates an example of a driving circuit 5 of the DC brushless motor 1 configured as described above. In this embodiment, the exciting coils 31 and 32 with the above-described two-layer structure have to generate magnetic fields in the opposite directions as shown in FIG. 1. The exciting coils 31 and 32 are connected in series when during acceleration and normal rotation, and driven with a rectangular-wave pulse (described later). Hence, if the exciting coils 31 and 32 are formed to be equivalent as shown in FIG. 5 (in FIG. 5, both the coils are wound clockwise when viewed from above), the directions of current have to be opposite to each other. Hence, an inner peripheral end (311) of one exciting coil (31) is connected with an outer peripheral end (321) of the other exciting coil (32), and an outer peripheral end (312) of the one exciting coil (31) and an inner peripheral end (322) of the other exciting coil (32) are respectively connected with lines 52 and 53 extending from a direct-current power supply 51 in the driving circuit 5. A switch element Tr0 that controls application of electricity is arranged in one of the lines 52 and 53 (in FIG. 8, 52 at the high side). Also, selection switch elements Tr1 and Tr2 for forward and reverse rotation directions (described later) are arranged in series between the lines 52 and 53. The inner peripheral end (311) of the one exciting coil (31) and the outer peripheral end (321) of the other exciting coil (32) are connected with a node 54 between the selection switch elements Tr1 and Tr2.

In contrast, if the wiring directions of the two exciting coils 31 and 32 are the opposite directions, the inner peripheral ends (311, 322) may be connected with one of the lines 52, 53 and the node 54 and the outer peripheral ends (312, 321) may be connected with the other of the lines 52, 53 and the node 54.

Figure 9:
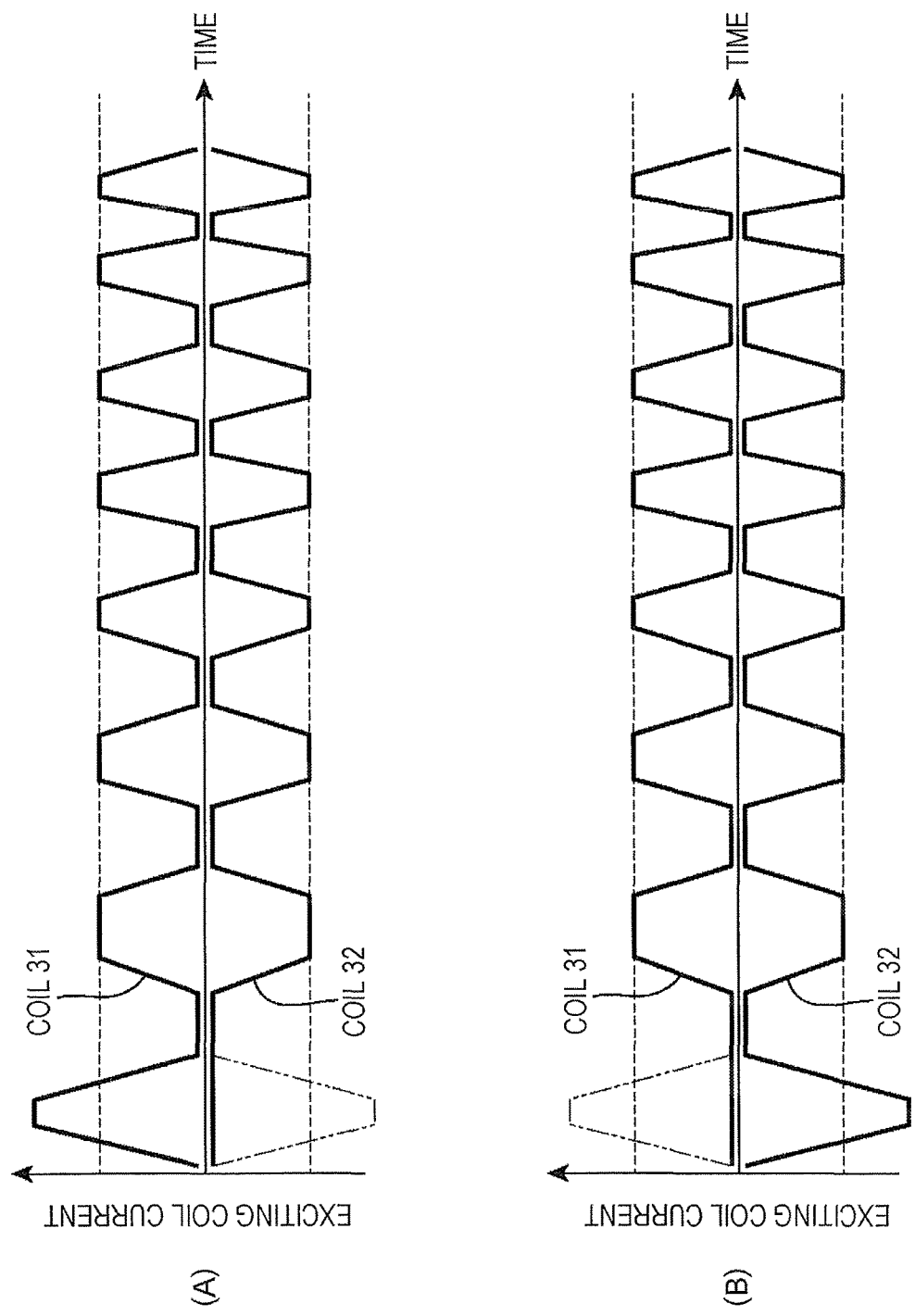
FIG. 9 is a waveform diagram for explaining an example of a driving method by the driving circuit shown in FIG. 8.
Figure 10:
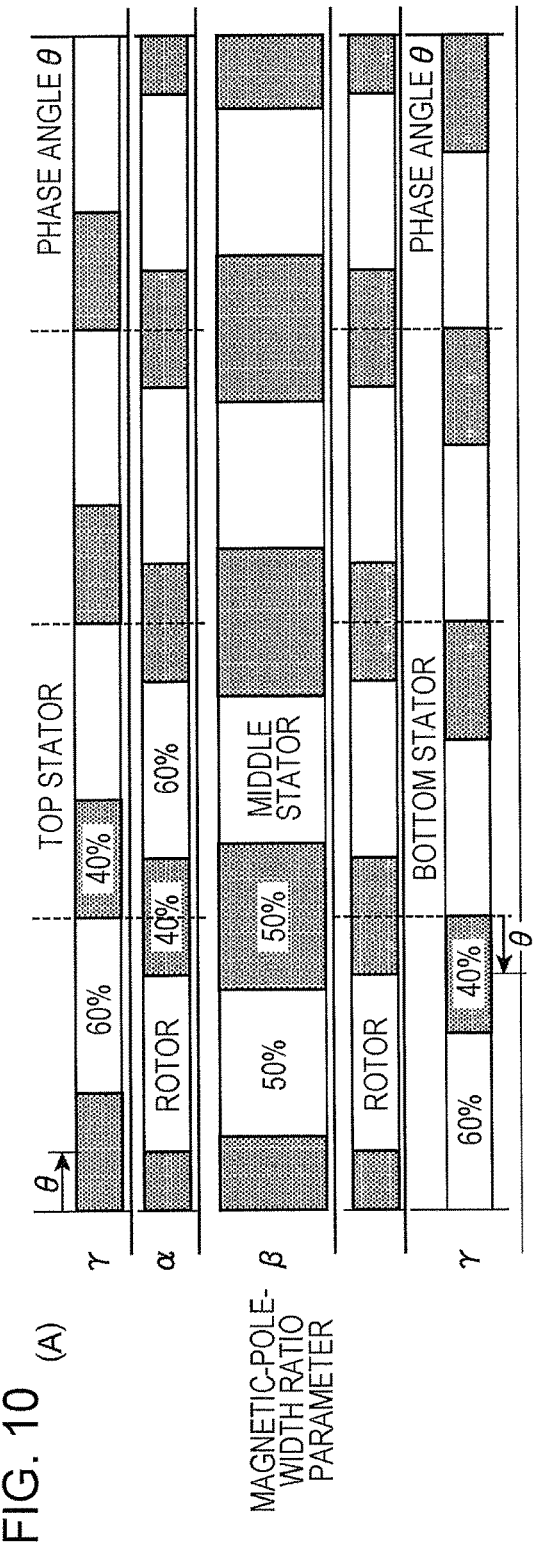
FIG. 10 illustrates a calculation result of an inductance with rotation when the rotor and the stator each have four magnetic poles and a predetermined magnetic pole width.
Figure 10:
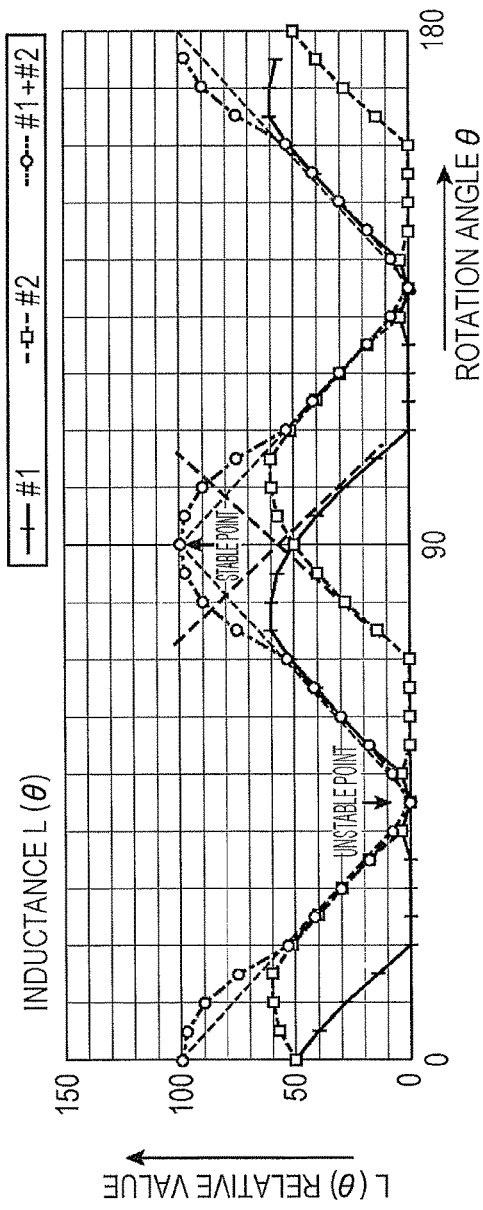

FIG. 9 is a waveform diagram for explaining a driving method by the driving circuit 5 configured as described above. FIG. 9(A) shows a case of forward rotation driving, and FIG. 9(B) shows a case of reverse rotation driving. FIG. 9 shows a driving waveform when it is assumed that the exciting coils 31 and 32 are equivalent. The inductance characteristic of the DC brushless motor 1 in FIG. 4 is, for example, as shown in FIG. 10. FIG. 10 illustrates a calculation result of an inductance $L(\theta)$ with rotation for a half cycle, when the number of the magnetic poles of the rotor 4 and the stator 2 is four, a magnetic pole width $\alpha$ of each of the magnetic poles of the rotor 4 with respect to a period of the magnetic pole is 40%, in the stator 2, a magnetic pole width $\gamma$ in the circumferential direction of each of the protrusions (magnetic poles) 212 and 232 at the top and bottom is 40% and a magnetic pole width $\beta$ in the circumferential direction of each of the protrusions (magnetic poles) 222 at the middle is 50%, and a shift angle $\theta$ of the corresponding protrusions (magnetic poles) 212 and 232 at the top and bottom with respect to the corresponding magnetic pole 222 at the middle is 18°. Although described later, in FIG. 10, a calculation result #1 indicated by a solid line represents an inductance of the one exciting coil 31, a calculation result #2 indicated by a broken line represents an inductance of the other exciting coil 32, and a result #1+#2 indicated by a dotted-chain line represents a combined inductance of both the exciting coils 31 and 32.

Referring to FIG. 10, if the rotor 4 is activated in the forward rotation direction, from among the two exciting coils 31 and 32, plus current is first applied to the one exciting coil (31 (#1)), and after the rotor 4 starts rotating, rectangular-wave current with reverse magnetic poles is applied to both the exciting coils (31, 32 (#1, #2)) as shown in FIG. 9(A). Accordingly, the DC brushless motor 1 can be accelerated or normally rotated. In contrast, to make reverse rotation, as shown in FIG. 9(B), minus current is applied to the other exciting coil (32 (#2)) when being activated, and after the rotor 4 starts rotating, rectangular current with reverse polarities is applied to both the exciting coils (31, 32 (#1, #2)). Accordingly, the DC brushless motor 1 can be accelerated or normally rotated. Hence, as shown in FIG. 9, the exciting coils 31 and 32 are driven by current with opposite phases, and hence driven with quasi-two phases. If the winding directions of the exciting coils 31 and 32 are opposite to each other, the exciting coils 31 and 32 are driven by current with the same phase. However, as described below, the exciting coils 31 and 32 are individually controlled by switching according to the activation.

In the driving circuit 5 shown in FIG. 8, to be more specific, if the rotor 4 is activated in the forward rotation direction, the selection switch element Tr1 is kept OFF, the selection switch element Tr2 and the switch element Tr0 are turned ON, hence a current path from the direct-current power supply 51 to the switch element Tr0, the exciting coil 31, the selection switch element Tr2, and then the direct-current power supply 51 is formed and activated. Then, the selection switch Tr2 is turned OFF, and hence the current path is switched to a current path from the direct-current power supply 51 to the switch element Tr0, the exciting coil 31, the exciting coil 32, and then the direct-current power supply 51. By turning ON/OFF the switch element Tr0, rectangular-wave current is applied. In contrast, if the rotor 4 is activated in the reverse rotation direction, the selection switch element Tr2 is kept OFF, the selection switch element Tr1 and the switch element Tr0 are turned ON, hence a current path from the direct-current power supply 51 to the switch element Tr0, the selection switch element Tr1, the exciting coil 32, and then the direct-current power supply 51 is formed and activated. Then, the selection switch Tr1 is turned OFF, and hence the current path is switched to a current path from the direct-current power supply 51 to the switch element Tr0, the exciting coil 31, the exciting coil 32, and then the direct-current power supply 51. By turning ON/OFF the switch element Tr0, rectangular-wave current is applied.

Figure 11:
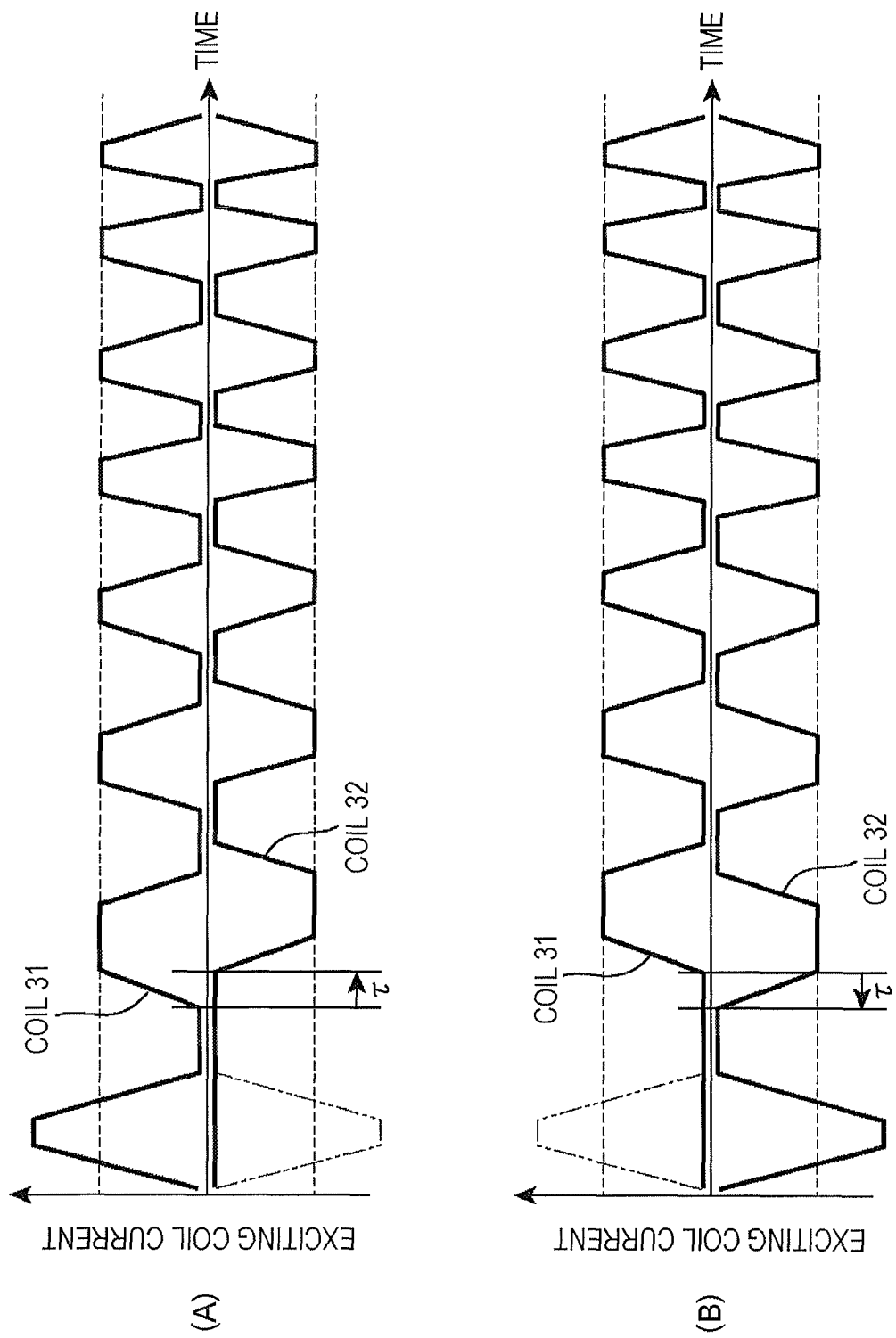
FIG. 11 is a waveform diagram for explaining another example of a driving method by the driving circuit shown in FIG. 8.

As shown in FIG. 11, if current is applied to only the exciting coil at the activation side and then a current pulse is applied to both the exciting coils for the acceleration and normal rotation, a current pulse to the exciting coil at the follow side (the side to which current is applied later) is preferably applied with delay. In FIG. 11, a time difference ti is provided between first current pulses that are applied to both the exciting coils. FIG. 11(A) and FIG. 11(B) respectively correspond to FIG. 9(A) and FIG. 9(B). The time difference τ is decreased as the rotation speed increases, and the time difference τ is increased as a shift θ between the protrusions (magnetic poles) 212 and 232 increases. Such control is made by a control circuit (not shown) in response to a detection result of a rotation angle position of the rotor 4 by an encoder (not shown). With this configuration, the DC brushless motor 1 can be further efficiently accelerated.

The activation current is not limited to a single pulse as shown in FIGS. 9 and 11, and may be a plurality of pulses. If an element that can output current with a variable voltage is used, the activation current may be a triangular wave. Even if the same activation pulse or drive pulse is input, the actual response to the pulse varies in accordance with the position of activation or the weight of a load. Hence, FIGS. 9 and 11 show merely examples. The control circuit successively controls the number of activation pulses or the peak value of the drive pulse in response to the detection result of the encoder.

Then, optimal ranges for the magnetic pole width γ and β of the stator 2, and an optimal range for the magnetic pole width α of the rotor 4 are described below with reference to the aforementioned FIGS. 10, and 12 to 14. A torque F·δx(=N·δθ) that is generated by the motor structure according to this embodiment is proportional to a change rate ∂L(θ)/∂θ of an inductance L approximated from a model magnetic circuit, which is provided below to a rotation angle θ of the rotor 4.

$$F \cdot \delta x = \qquad [\text{Math. 1}]$$
$$N \cdot \delta \theta = \Delta E = \frac{\partial}{\partial \theta}\left(\frac{1}{2}L_{(\theta)}I^2\right) \cdot \delta \theta = \frac{1}{2}I^2 \frac{\partial L_{(\theta)}}{\partial \theta} \cdot \delta \theta \Rightarrow N \propto \frac{\partial L_{(\theta)}}{\partial \theta}$$

Here, an approximation model is used, in which a gap (g) between the magnetic poles of the stator 2 and the rotor 4 is sufficiently small and the magnetic flux lines pass through only a region where the magnetic poles overlap each other. In this case, an inductance of an equivalent magnetic circuit of this motor structure is inversely proportional to a series magnetic resistance of a magnetic resistance between the protrusions (magnetic poles) 212, 232 and the rotor 4 and a magnetic resistance between the rotor 4 and the protrusions (magnetic poles) 222. Hence, the following approximately estimated expression is obtained.

$$L_{(\theta,\phi)} \propto \frac{1}{\frac{g_{upper}}{S_{upper(\theta)}} + \frac{g_{lower}}{S_{lower(\theta,\phi)}}} \approx \qquad [\text{Math. 2}]$$
$$\frac{1}{g\left(\frac{1}{S_{upper(\theta)}} + \frac{1}{S_{lower(\theta,\phi)}}\right)} \propto \frac{S_{upper(\theta)} \times S_{lower(\theta,\phi)}}{S_{upper(\theta)} + S_{lower(\theta,\phi)}}$$

where $S_{u/l}$ n is an overlap area between protrusion poles of the rotor and the stator $$\Delta L \equiv L_{max} - L_{min}, \quad \frac{\Delta L}{2L} \equiv \frac{L_{max} - L_{min}}{L_{max} + L_{min}}[\%]$$

Here, $g_{upper}$ is a gap length between the protrusions (magnetic poles) 212, 232 and the protrusions (magnetic poles) 41 of the rotor 4, $g_{lower}$ is a gap length between the protrusions (magnetic poles) 222 and the protrusions (magnetic poles) 41 of the rotor 4, $S_{upper}(\theta)$ is an overlap area between facing surfaces of the protrusions (magnetic poles) 212, 232 and the protrusions (magnetic poles) 41 of the rotor 4, and $S_{lower}(\theta)$ is an overlap area between facing surfaces of the protrusions (magnetic poles) 222 and the protrusions (magnetic poles) 41 of the rotor 4.

That is, the overlap area of the magnetic poles is the inductance L, and the magnitude of the torque can be approximately evaluated by a difference ΔL between a maximum value Lmax and a minimum value Lmin of the inductance L.

Figure 12:
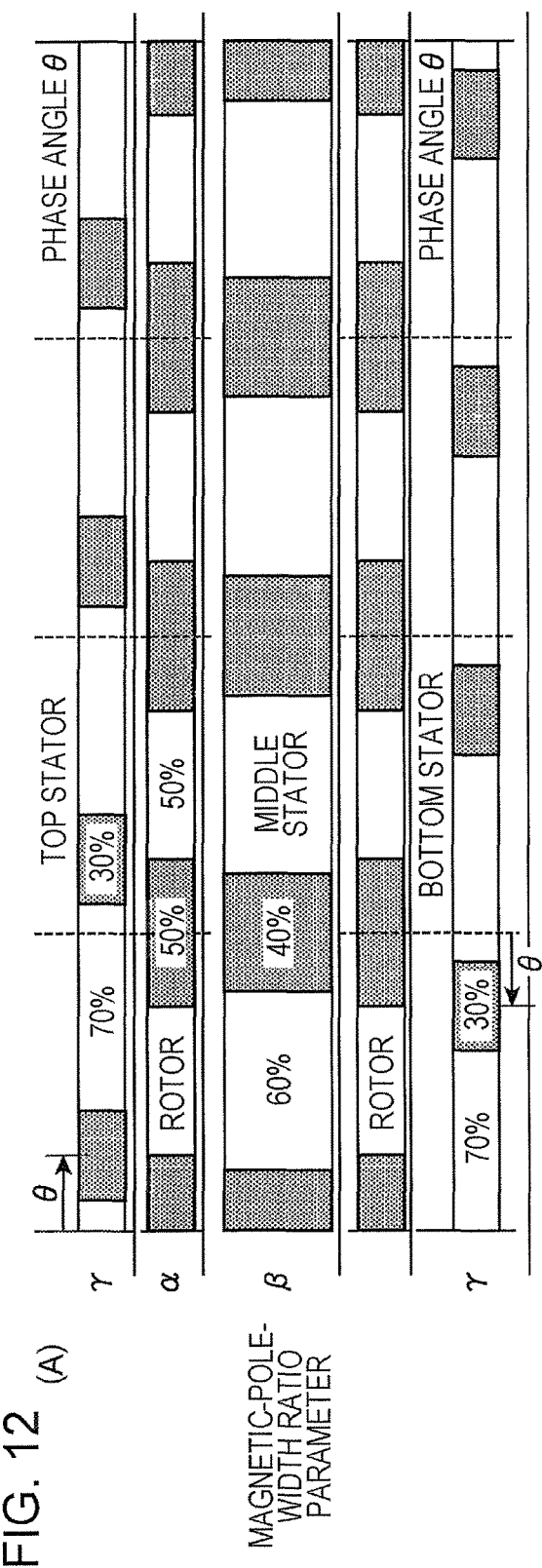
FIG. 12 illustrates a calculation result of an inductance with rotation when the rotor and the stator each have four magnetic poles and a changed magnetic pole width.
Figure 12:
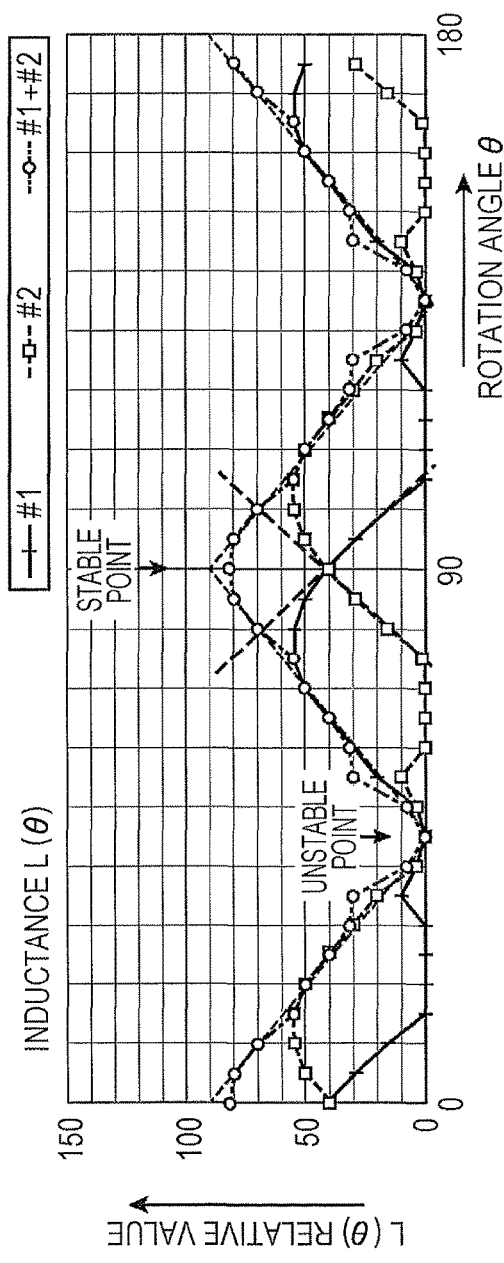
Figure 13:
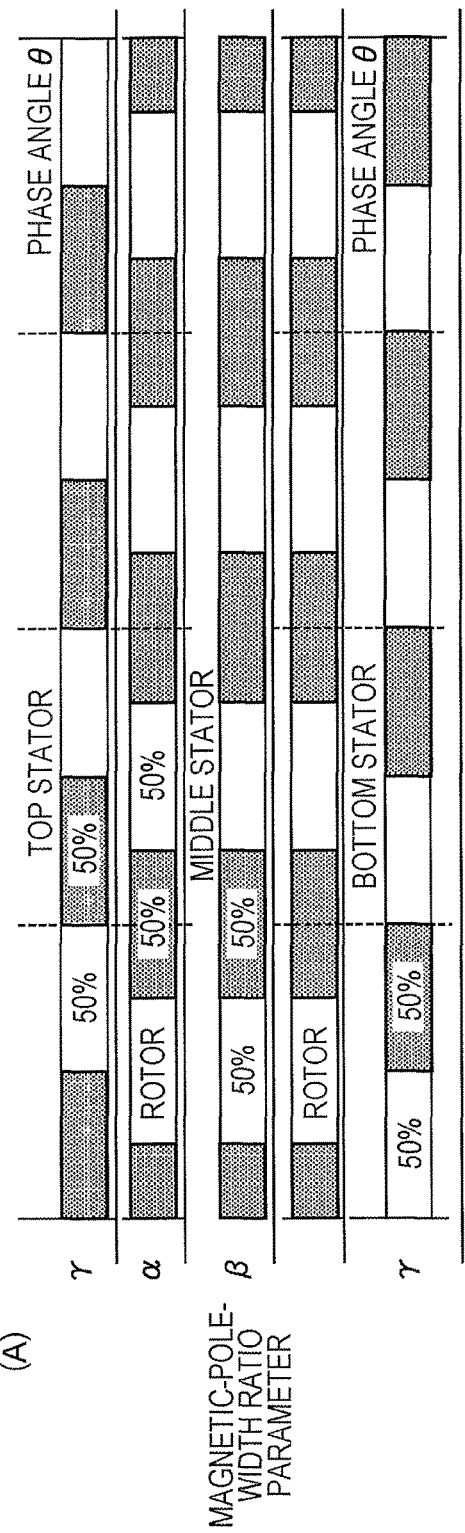
FIG. 13 illustrates a calculation result of an inductance with rotation when the rotor and the stator each have four magnetic poles and a changed magnetic pole width.
Figure 13:
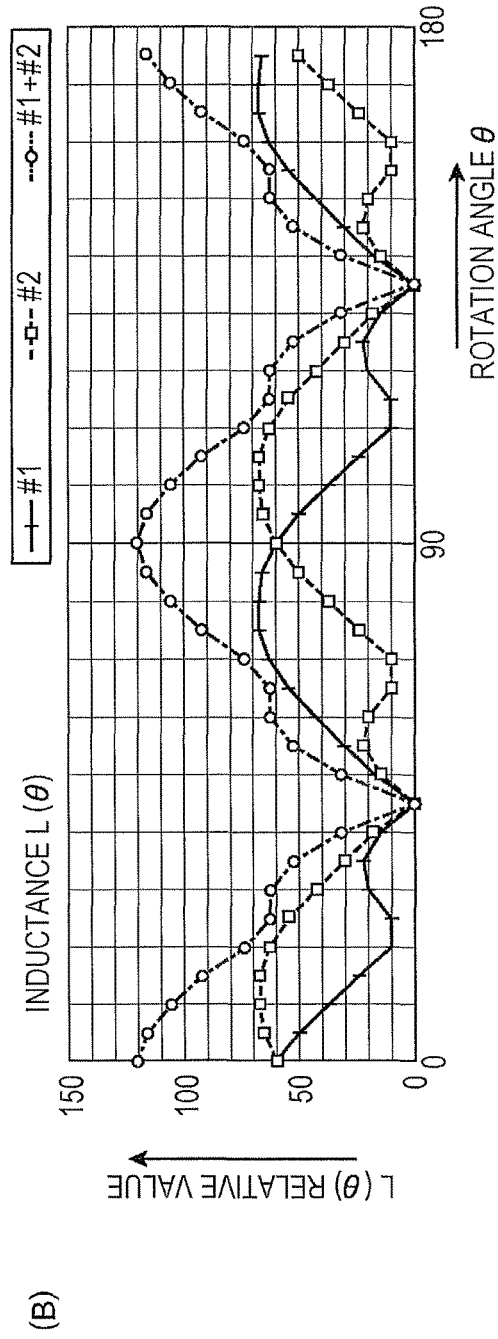
Figure 14:
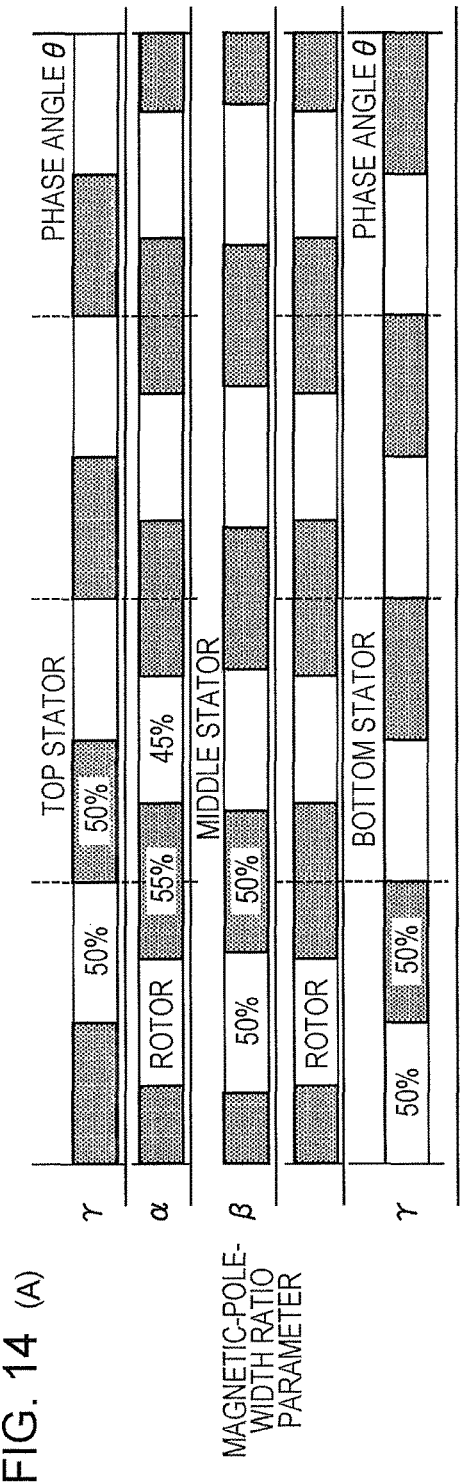
FIG. 14 illustrates a calculation result of an inductance with rotation when the rotor and the stator each have four magnetic poles and a changed magnetic pole width.
Figure 14:
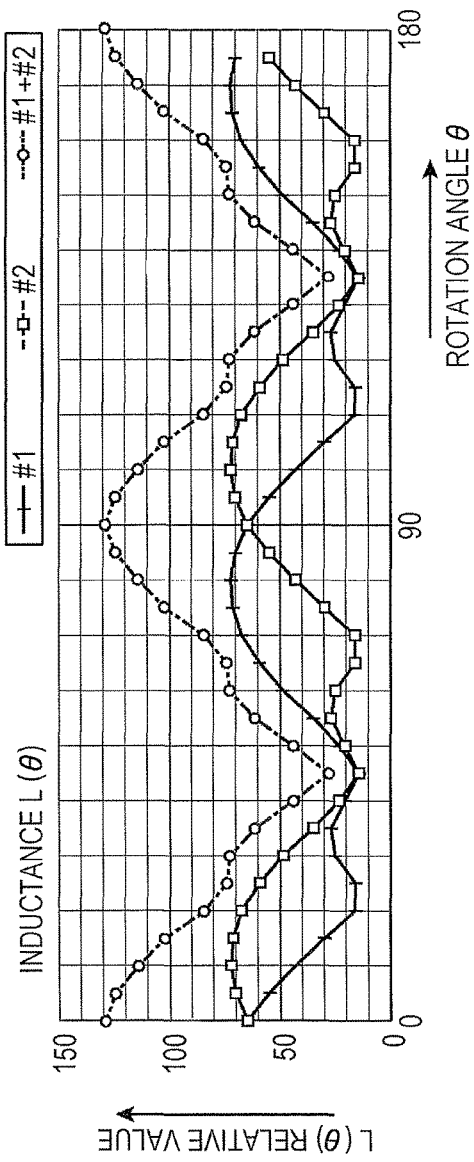

In FIGS. 12 to 14, like the aforementioned case in FIG. 10, the number of magnetic poles of the rotor 4 and the stator 2 is four. However, In FIGS. 12 to 14, the shift angle θ between the protrusions (magnetic poles) 212 and 232 at the top and bottom is 22.5°. In FIGS. 10, 13, and 14, the magnetic pole width β in the circumferential direction of the protrusions (magnetic poles) 222 at the middle is 50%, and in FIG. 12, the magnetic pole width β is 40%. Also, the magnetic pole width γ in the circumferential direction of the protrusions (magnetic poles) 212 and 232 at the top and bottom is 50% in FIGS. 13 and 14, is 40% in FIG. 10, and is 30% in FIG. 12. Also, the magnetic pole width α in the circumferential direction of the protrusions (magnetic poles) 41 of the rotor 4 is 50% in FIGS. 12 and 13, is 40% in FIG. 10, and is 55% in FIG. 14.

The maximum value Lmax of the inductance L(θ) is minimum if γ=30% as shown in FIG. 12, and is increased as the magnetic pole width γ increases such that γ=40% in FIG. 10 and γ=50% in FIGS. 13 and 14. Hence, the magnetic pole width γ meets 30%≤γ. Also, the magnetic pole width γ meets γ≤α, β to capture many magnetic fluxes of the protrusions (magnetic poles) 212 and 232 at the top and bottom. Further, in FIGS. 10, 12, and 13, the minimum value Lmin of the inductance L(θ) is 0. However, the minimum value Lmin is not 0 in FIG. 14. Hence, the magnetic pole widths α and β meet α, β≤55%. With the relationships, the magnetic pole widths α, β, and γ meet 30%≤γ≤α, β≤55%.

Assuming that the number of magnetic poles is n, when γ=50%, if θ exceeds θ=360°/4n, the protrusions (magnetic poles) 212 and 232 at the top and bottom partly overlap each other in a view from above. Hence, the shift angle θ is θ≤360°/4n, and for example, when n=4, θ≤22.5°. Also, even when the overlap ratio of the protrusions (magnetic poles) 212 and 232 at the top and bottom is high, the magnetic flux generated at the other magnetic pole serves as a brake torque for the magnetic flux generated at the one magnetic pole. Hence, the shift angle θ is 360°/8n≤θ, and for example, when n=4, 11.25°≤θ.

Figure 15:
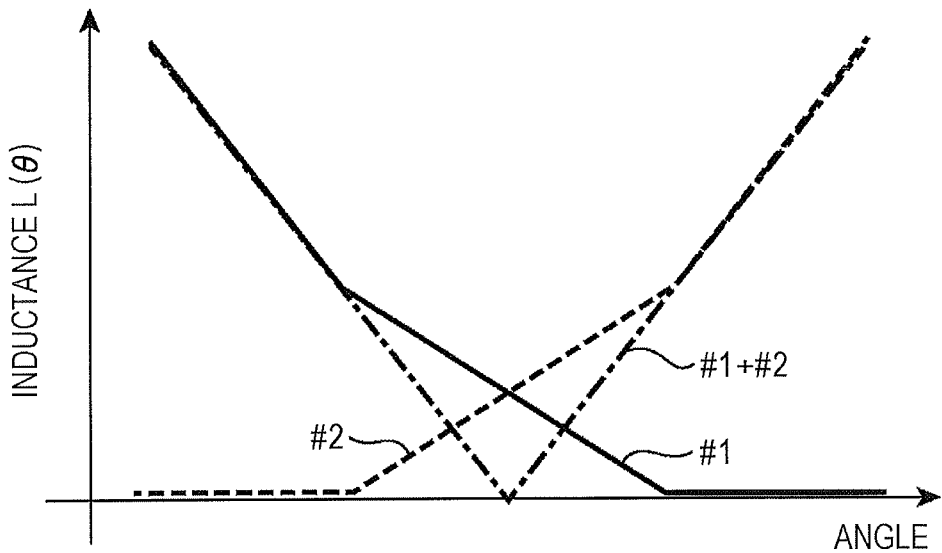
FIG. 15 schematically illustrates part of any of FIGS. 10, and 12 to 14 in an enlarged manner.

Here, to obtain a torque, a change in the inductance L(θ) (=#1+#2) has to be large. Also, to start the rotation during activation in a desirable direction, the inductance L(θ) (=#1+#2) has to have an increase (decrease) change gradient (to generate activation torque). In the examples in FIGS. 10, and 12 to 14, the activation gradient is obtained in an area around the maximum value Lmax; however, the activation torque is not obtained in an area near the minimum value Lmin. However, if these graphs are enlarged and schematically illustrated, as shown in FIG. 15, the inductance L(θ) (=#1, #2) has an increase (decrease) change gradient even in the area around the minimum value Lmin, and the activation can be made with the activation pulses shown in FIGS. 9 and 11.

The inductance during SR driving has two types of balanced points for the maximum value Lmax and minimum value Lmin. Each balanced point corresponds to a "stable point" at which the magnetic poles face each other, or an "unstable point" at which the magnetic poles are alternately arranged. Unless an abnormal external force acts, the rotor does not stay at the latter point at rest. Hence, the activation can be made even under the condition that the magnetic pole width α of the rotor 4 is 50%. However, even if a motor load is special and the rotor may be possibly brought into rest at the latter balanced point, the activation can be made in a desirable direction of the forward and reverse rotation directions by properly using the protrusions (magnetic poles) 212, 222, and 232 of the stator 2. This is indicated by a calculation example with the magnetic pole width α=55% in FIG. 14. However, if the magnetic pole width becomes too large, the torque for SR driving is lost.

Consequently, in view of controllability for the torque and activation rotation, a ratio α of a circumferential length of a distal end of each of the protrusions (magnetic poles) 41 of the rotor 4, in a cylindrical plane of a locus of the distal end of the protrusion (magnetic pole) 41 of the rotor 4, preferably meets 30%≤α≤55% (i.e., a ratio of a gap between the protrusions (magnetic poles) 41 is preferably 70% or lower and 45% or higher). With this configuration, the DC brushless motor 1 can generate a large torque and can be activated from any stop position.

Table 1 shows a result of comparison between the DC brushless motor 1 according to this embodiment and a motor of each type according to related art.

depending on the rotation angle. Hence, independent activation may not be made. A SR motor (switched reluctance motor) is rotated by a change in magnetic resistance as a driving force. Hence, at a rotation angle position without a change in magnetic resistance, a torque cannot be obtained. During rotation, for example, during rotation at a constant speed, the motor can be rotated by the inertia even at a rotation angle without a torque. However, the motor cannot be activated at rest at a rotation angle without a torque.

In this embodiment, the exciting coils 31 and 32 have the two-layer structure, the iron core member 20 of the stator 2 has the substantially E-shaped cross-section in the axis Z direction when the iron core member 20 is developed in the circumferential direction, the plurality of protrusions 212, 222, and 232 serving as the magnetic poles are formed periodically in the circumferential direction at the three parallel sections 211, 221, and 231 of the E shape, and the ring-shaped exciting coils 31 and 32 are respectively housed in the two recesses 24 and 25 of the E shape. Also, the rotor 4 is formed of the iron core member 40 having the plurality of protrusions 41 serving as the magnetic poles periodically in the circumferential direction. The numbers of the protrusions (magnetic poles) 212, 222, and 232 at the three parallel sections 211, 221, and 231 of the E shape are equivalent. The corresponding protrusions (magnetic poles) 212 and 232 at the top and bottom are positioned to be shifted in the opposite directions with respect to the center line of the corresponding protrusion (magnetic pole) 222 at the middle.

Accordingly, with the DC brushless motor 1 configured as described above, the SR motor which is not rotated by one phase can be activated, and when the rotation is started, magnetic circuits for two phases constantly contribute to generation of a torque. Thus, space efficiency (output per size) can be increased. Further, the SR motor can obtain a torque required for rotation of the rotor without a magnet by utilizing a change in magnetic resistance between the rotor and the stator as a driving force. Accordingly, with the DC

TABLE 1

|  |  | Driving coil | | |
|---|---|---|---|---|
|  |  | Plural and multiple phases | Single/one phase | Expensive (rare) ↑ Material ↓ Not expensive (plenty) |
| Permanent magnet | Required | PM motor (IPM, SPM) | Claw teeth, claw pole DC motor (with brush) | |
|  | Not required | SR motor, stepping motor, induction motor | This embodiment | |
|  |  | Core/wire structure | | |
|  |  | Complicated ← → Simple | | |

That is, the DC brushless motor 1 according to this embodiment performs operation of a SR motor that does not require a permanent magnet and can be realized with an inexpensive material, and can be decreased in cost by simplifying the core and wire structure like the claw teeth motor or the claw pole motor. Also, the DC brushless motor 1 according to this embodiment does not have to consider thermal demagnetization of a magnet, and hence can be operated at high temperatures as compared with a PM motor.

Here, this SR motor does not generate a rotational magnetic field with one phase, a torque cannot be obtained at rest brushless motor that is a power source necessary for industrial use and consumer use, rare metal in rare earth magnet etc. can be saved.

Also, with the DC brushless motor 1 according to this embodiment, when the corresponding protrusions (magnetic poles) 212 and 232 at the top and bottom are shifted in the opposite directions with respect to the center line Y of the corresponding protrusion (magnetic pole) 222 at the middle, by arranging the protrusions at the same distance (angle θ), in other words, by equalizing the shift, the torque can become almost uniform.

Also, with the DC brushless motor 1 according to this embodiment, as shown in FIG. 5 etc., the exciting coils 31 and 32 are each formed by winding the strip-shaped conductive member in a flatwise manner so that the width direction thereof extends along the rotation-axis Z direction of the exciting coils 31 and 32. In general, when electricity is applied to a coil, since the coil is formed of a conductor, eddy current is generated in a plane perpendicular to magnetic force lines (orthogonal plane) shown in FIGS. 1 and 6, and a loss is generated by the eddy current. The magnitude of the eddy current is proportional to the area of a plane intersecting with the magnetic flux lines, i.e., the area of a continuous plane perpendicular to the magnetic flux lines if the magnetic flux density is the same. Since the magnetic flux lines extend along the axial direction in the coil, the eddy current is proportional to the area of a plane in a radial direction orthogonal to the axis Z direction of the conductor that forms the coil. Hence, the strip-shaped conductive member that forms the exciting coils 31 and 32 is preferably formed such that a ratio t/W of a thickness t in the radial direction to a width W is 1/10 or smaller.

With this configuration, the eddy current is restricted, and heat generation is restricted. Also, since the strip-shaped conductive member can be wound without a gap, the current density can be increased and heat can be efficiently radiated from the inside of the conductive member, as compared with a case in which a cylindrical elemental wire is wound. Further, if the thickness t of the conductive member is equal to or smaller than a skin thickness with respect to a frequency of alternating current power fed to the exciting coils 31 and 32, the eddy current loss can be further decreased. The skin thickness $\delta$ is generally expressed by $\delta=(2/\omega\mu\rho)^{1/2}$ where $\omega$ is an angular frequency of the alternating current power, $\mu$ is a permeability of the conductive member, and $\rho$ is an electric conductivity of the conductive member.

Also, in the DC brushless motor 1 configured as described above, the gap that is generated between the exciting coils 31, 32, and the recesses 24, 25 of the stator 2 is preferably filled with a thermally conductive member. With this configuration, heat generated at the exciting coils 31 and 32 can be efficiently conducted to the two iron core members 20 that surround the exciting coils 31 and 32 through the thermally conductive member. Accordingly, heat radiation performance can be improved.

Also, in the DC brushless motor 1 configured as described above, inner surfaces of the sections 211 and 231 of the stator 2 facing one ends of the exciting coils 31 and 32 in the rotation-axis Z direction, and an inner surface of the section 221 facing the other ends are preferably formed in parallel at least in a region covering the ends. This is because, if the above-described conditions are set for the exciting coils 31 and 32 (the wire structure is the flatwise wire structure and the width W is larger than the thickness t), if the sections 211, 221, and 231 that cover both upper and lower end surfaces of the exciting coils 31 and 32 have an inclination, the magnetic flux lines (magnetic force lines) that actually pass through the inside of the exciting coils 31 and 32 are not substantially parallel to the rotation-axis Z direction particularly in areas near both the upper and lower end surfaces.

The inventor of this case verified the distribution of magnetic flux lines while the degree of parallelism of the inner wall surfaces of the sections 211, 221, and 231 was changed. For example, if the degree of parallelism is 1/100, the magnetic flux lines passing through the inside of the exciting coils 31 and 32 are parallel to the rotation-axis Z direction. If the degree of parallelism is −1/10 or 1/10, the magnetic flux lines passing through the inside of the exciting coils 31 and 32 are not parallel to the rotation-axis Z direction. With this verification, to allow the magnetic flux lines passing through the inside of the exciting coils 31 and 32 to be parallel, the absolute value of the degree of parallelism is preferably 1/50 or smaller.

Also, in the DC brushless motor 1 according to this embodiment, the iron core members of the stator 2 and the rotor 4 are each preferably formed of any of a powder magnetic core made of iron-base soft magnetic powder, a ferrite magnetic core, and a magnetic core made of a soft magnetic material in which soft magnetic alloy powder is dispersed in resin. With this configuration, the two magnetic cores of the rotor 4 and the stator 2 can be molded into optimally complicated desirable shapes. A desirable magnetic property can be relatively easily obtained, and the magnetic cores can be relatively easily formed into desirable shapes.

The soft magnetic powder is ferromagnetic metal powder. More specifically, the soft magnetic powder may be, for example, pure iron powder, iron-base alloy powder (Fe—Al alloy, Fe—Si alloy, Sendust, a permalloy, etc.), amorphous powder, and iron powder with an electrical insulating film, such as a phosphoric acid chemical conversion film, being formed on the surface thereof. The soft magnetic material may be manufactured by, for example, a method of microparticulation by atomizing etc., or a method of pulverizing iron oxide etc. and then reconstituting the pulverized iron oxide.

Such soft magnetic powder may be used solely or by mixing with non-magnetic powder such as resin. The ratio of the mixture can be relatively easily adjusted. By properly adjusting the mixture ratio, the magnetic property of the magnetic core member can easily attain a desirable magnetic property. The material of the two exciting coils 31 and 32 that form the stator 2, and the material of the rotor 4 are preferably the same material in view of cost reduction.

Second Embodiment

Figure 16:
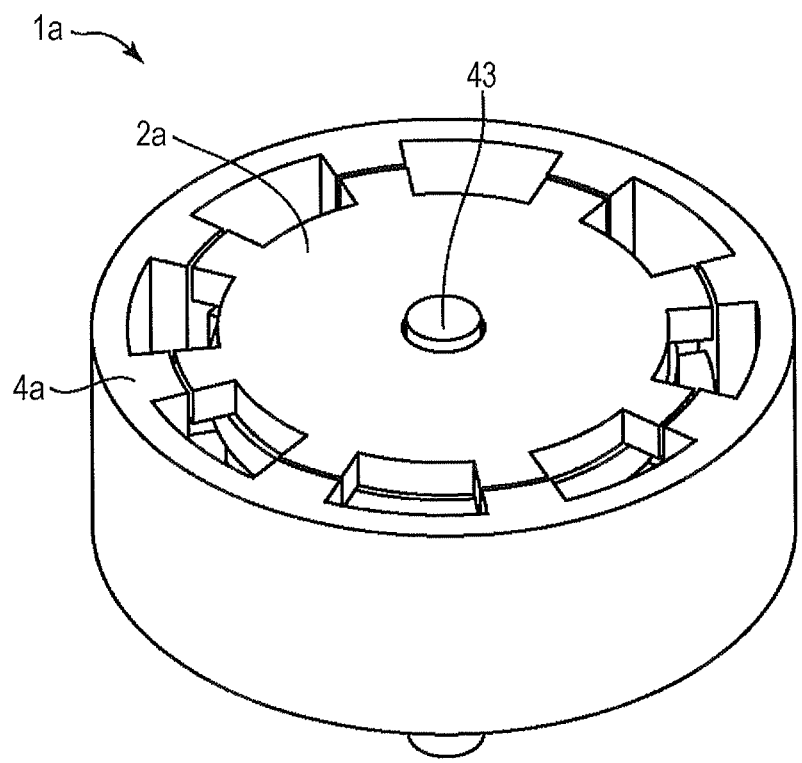
FIG. 16 is a perspective view showing an inner structure when a casing of a DC brushless motor according to a second embodiment is removed.
Figure 17:
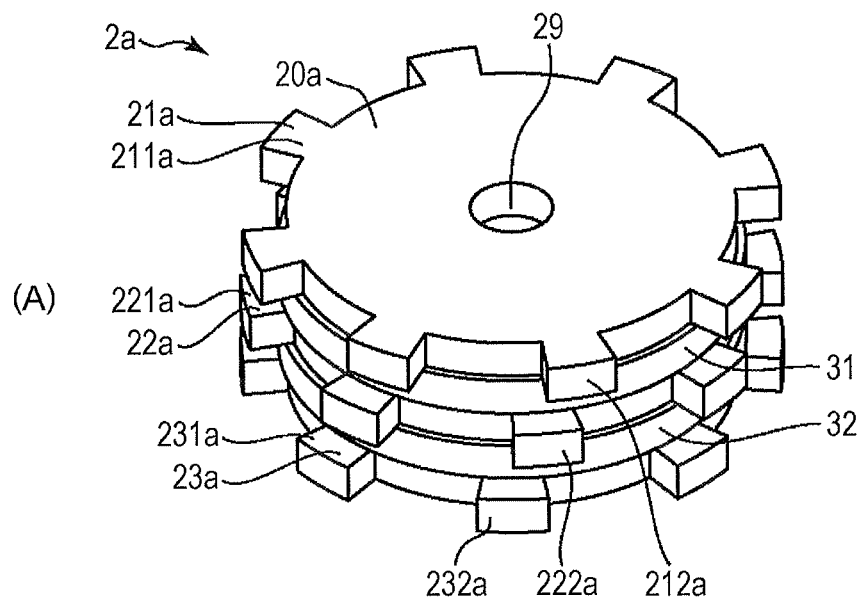
FIG. 17 is an exploded perspective view of the DC brushless motor shown in FIG. 16.
Figure 17:
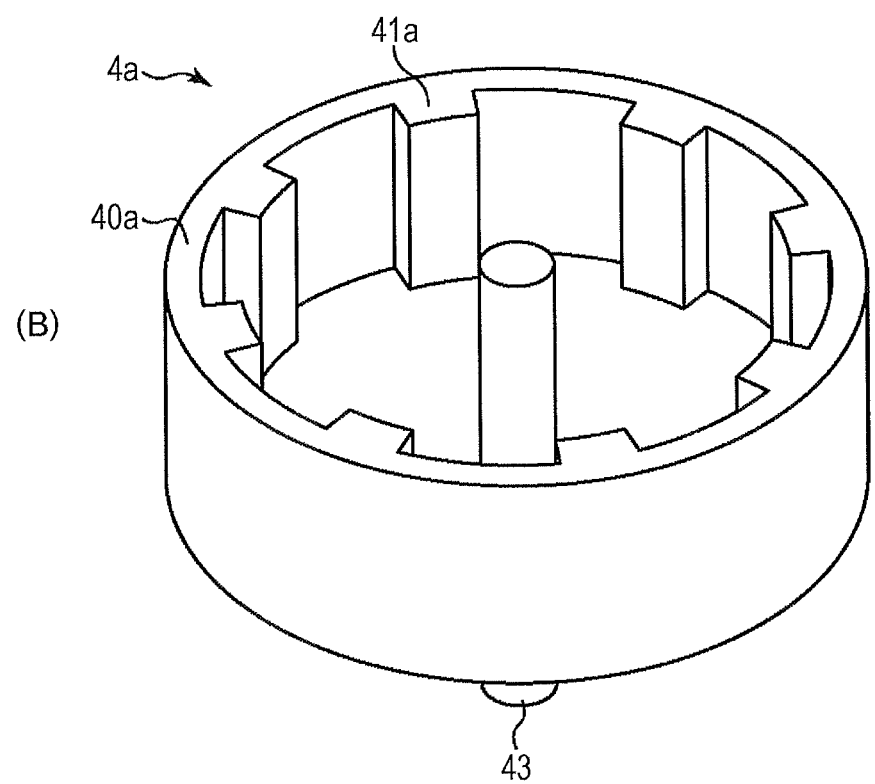

FIG. 16 is a perspective view showing an inner structure when a casing of a DC brushless motor 1a according to a second embodiment is removed. FIG. 17 is an exploded perspective view of the DC brushless motor 1a. FIG. 17(A) is an exploded perspective view of a stator 2a. FIG. 17(B) is an exploded perspective view of a rotor 4a. While the DC brushless motor according to the first embodiment is an inner rotor, the DC brushless motor 1a according to the second embodiment is an outer rotor. Hence, in the DC brushless motor 1a according to the second embodiment, the stator 2a at the inner periphery side is fixed to a fixed shaft 43, and the rotor 4a is provided at the outer periphery side of the stator 2a. In the DC brushless motor 1a, the same reference sign and an alphabetic character a are applied to the part having a function corresponding to that of the DC brushless motor 1. Accordingly, functions of parts are easily understood.

In particular, even in the DC brushless motor 1a, like the DC brushless motor 1, the exciting coils 31 and 32 have a two-layer structure, an iron core member 20a of the stator 2a has a substantially E-shaped cross-section in the axis Z direction when being developed in the circumferential direction, a plurality of protrusions 212a, 222a, and 232a serving as magnetic poles are formed at three parallel sections 211a, 221a, and 231a of the E shape periodically in the circumferential direction, and the ring-shaped exciting coils 31 and 32 are respectively housed in two recesses of the E shape. The numbers of protrusions (magnetic poles) 212a, 222a, and 232a at the three parallel sections 211a, 221a, and 231a of the E shape are equivalent. The corresponding protrusions (magnetic poles) 212a and 232a at the top and bottom are positioned to be evenly shifted in the opposite directions with respect to the center line of the corresponding protrusion (magnetic pole) 222a at the middle. Also, the rotor 4a is formed of an iron core member 40a having a plurality of protrusions 41a serving as magnetic poles periodically in the circumferential direction. With this configuration, the outer rotor structure can be also realized.

Third Embodiment

Figure 18:
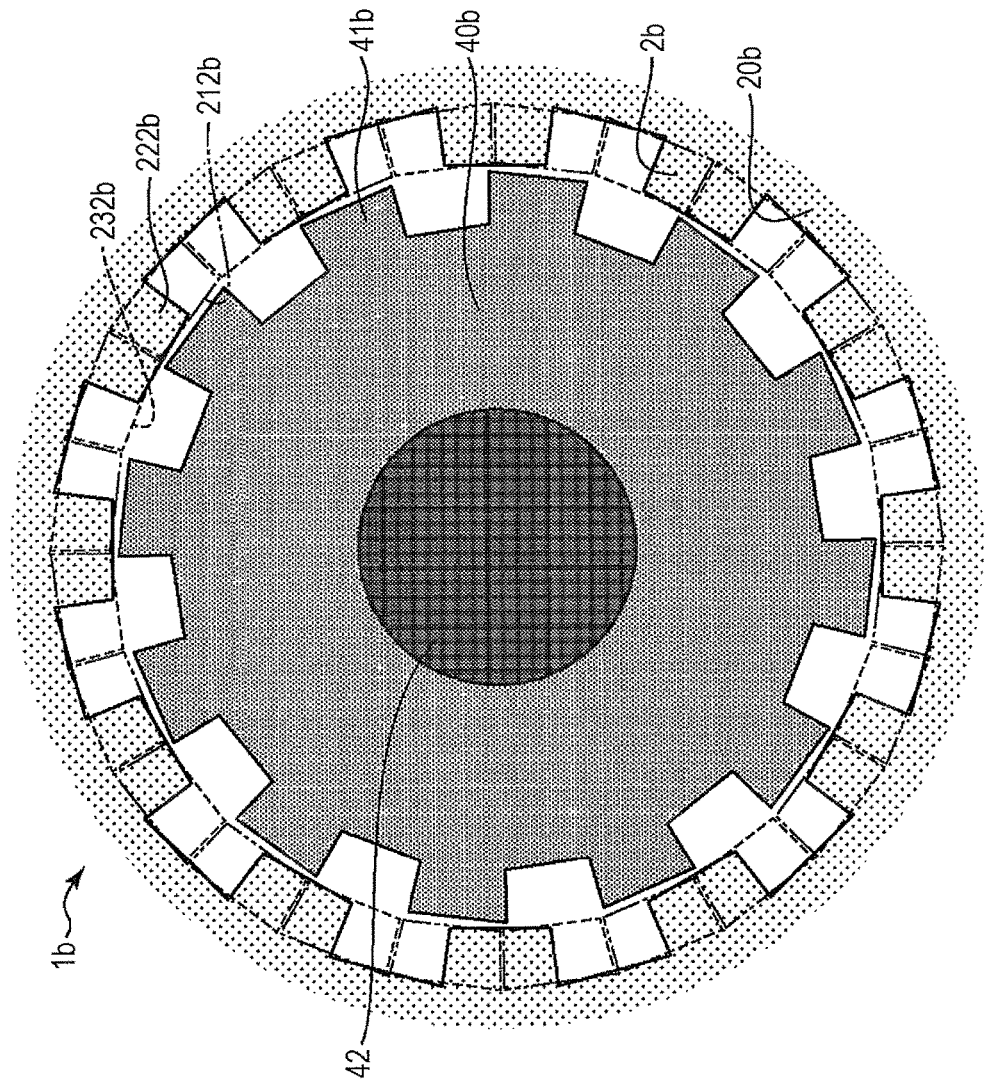
FIG. 18 is a sectional view perpendicular to the axis of a DC brushless motor according to a third embodiment.

FIG. 18 is a sectional view perpendicular to the axis of a DC brushless motor 1b according to a third embodiment. In the DC brushless motor 1 according to the first embodiment, the protrusions (magnetic poles) 212, 222, and 232 of the stator 2 and the protrusions (magnetic poles) 41 of the rotor 4 each have an arcuate section in a plane perpendicular to the axis. However, in the DC brushless motor 1b according to the third embodiment shown in FIG. 18, protrusions (magnetic poles) 212b, 222b, and 232b of a stator 2b and protrusions (magnetic poles) 41b of a rotor 4b are each formed in a rectangular shape like a stepping motor.

Fourth Embodiment

Figure 19:
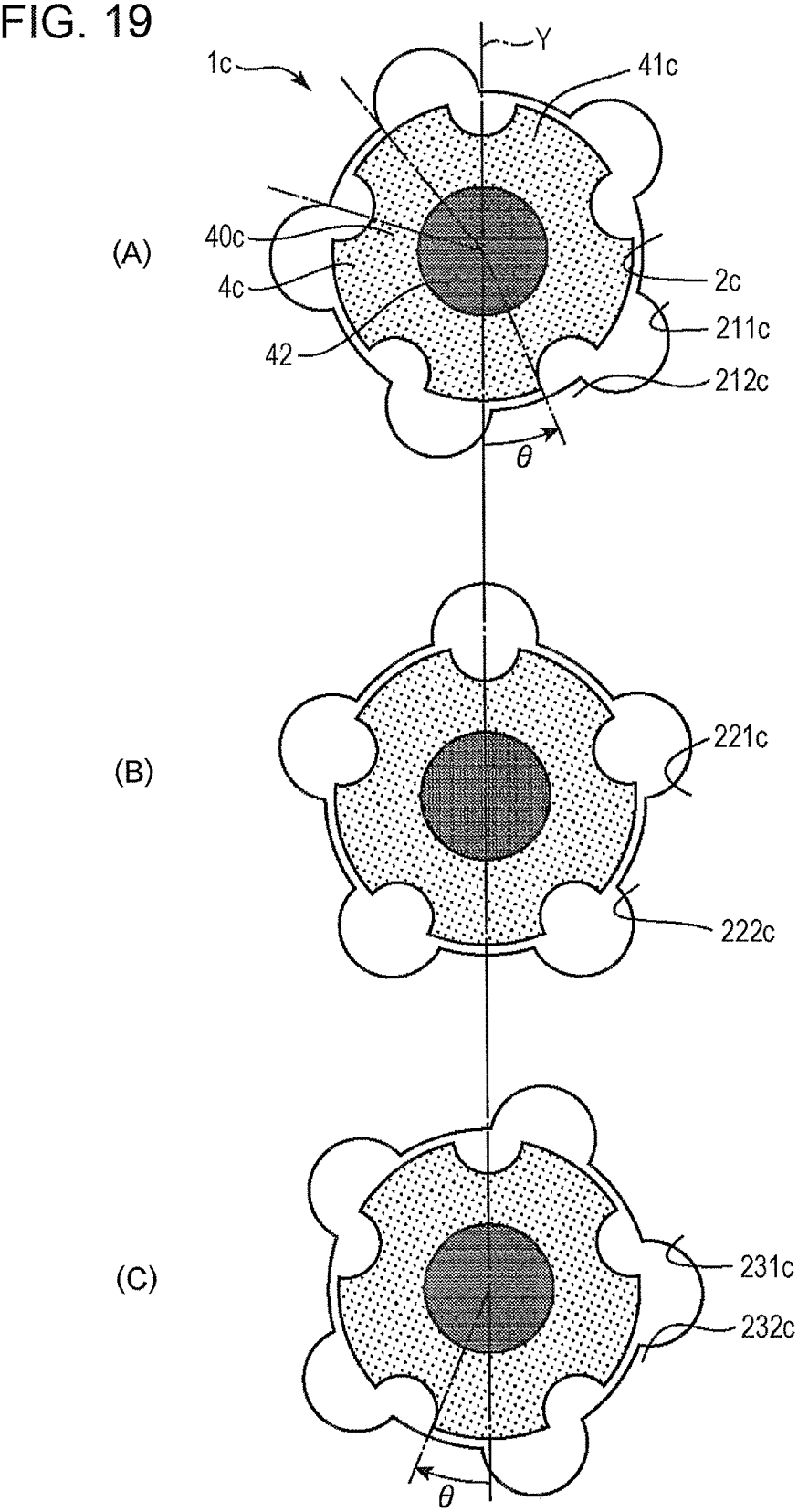
FIG. 19 is a sectional view perpendicular to the axis of a DC brushless motor according to a fourth embodiment.

FIG. 19 is a sectional view perpendicular to the axis of a DC brushless motor 1c according to a fourth embodiment. In the DC brushless motor 1 according to the first embodiment, the protrusions (magnetic poles) 212, 222, and 232 of the stator 2 and the protrusions (magnetic poles) 41 of the rotor 4 have four pole configurations. However, in the DC brushless motor 1c according to the fourth embodiment shown in FIG. 19, protrusions (magnetic poles) 212c, 222c, and 232c of a stator 2c and protrusions (magnetic poles) 41c of a rotor 4c have five pole configurations. In this case, the shift angle θ is θ≤18°. FIGS. 19(A), 19(B), and 19(C) respectively correspond to FIGS. 4(A), 4(B), and 4(C) showing the sectional views at the positions cut along A-A, B-B, and C-C in FIG. 1.

As shown in FIGS. 18 and 19, the number of magnetic poles and the shapes of the magnetic poles may be desirably selected.

This specification discloses techniques according to various aspects as described above, and major techniques from among these techniques are described below.

A DC brushless motor according to an aspect includes a stator including exciting coils; and a rotor provided coaxially to the stator. A change in magnetic resistance between the stator and the rotor caused by a flow of a magnetic flux, which is generated around the exciting coils, is utilized as a driving force. The stator includes an iron core member having a substantially E-shaped cross-section in an axial direction at a radius part and having a plurality of protrusions, which serve as magnetic poles and are formed in a circumferential direction at each of three parallel sections of the E shape, and the ring-shaped exciting coils housed in two recesses of the E shape. The rotor includes an iron core member having a plurality of protrusions, which serve as magnetic poles and are formed in the circumferential direction. The numbers of the magnetic poles at the three parallel sections of the E shape are equivalent. From among the magnetic poles at the three parallel sections of the E shape, the corresponding top and bottom magnetic poles are positioned to be shifted in opposite directions in the circumferential direction with respect to a center line of the corresponding middle magnetic pole.

Conventionally, a SR motor has been used for a motor not using a permanent magnet. This SR motor is a motor that uses a reluctance torque caused by a change in magnetic resistance with rotation, and that is rotated by successively switching application of current to a coil of a stator to which a protruding pole of a rotor approaches. Hence, since the rotor does not use a magnet, the cost is low, and thermal demagnetization of a magnet does not have to be considered. Accordingly, operation at high temperatures can be performed as compared with the aforementioned PM motor.

Meanwhile, since this SR motor does not generate a rotational magnetic field with one phase, a torque cannot be obtained at rest depending on the rotation angle. Hence, independent activation may not be made. The SR motor is rotated by a change in magnetic resistance as a driving force. Hence, at a rotation angle position without a change in magnetic resistance, a torque cannot be obtained. During rotation at a constant speed, the motor can be rotated by the inertia even at a rotation angle without a torque. However, the motor cannot be activated at rest at a rotation angle without a torque. Thus, the motor cannot be rotated.

Therefore, the following configuration is employed. In particular, provided are an iron core member having a substantially E-shaped cross-section in the axial direction at a radius part and having a plurality of protrusions, which serve as magnetic poles and are formed in the circumferential direction at each of three parallel sections of the E shape, and the ring-shaped exciting coils housed in two recesses of the E shape. For example, in the case of the inner rotor, the iron core member of the stator at the outer periphery side has a shape in which three edges (rings) extend from a cylindrical outer wall toward the inner periphery side. The rotor includes an iron core member having a plurality of protrusions, which serve as magnetic poles and are formed in the circumferential direction. Further, the numbers of the magnetic poles at the three parallel sections of the E shape are equivalent. From among the magnetic poles at the three parallel sections of the E shape, the corresponding top and bottom magnetic poles are positioned to be shifted in the opposite directions in the circumferential direction with respect to the center line of the corresponding middle magnetic pole.

Also, a method for controlling the DC brushless motor configured as described above includes applying plus current to one of the two exciting coils if the rotor is activated in a forward rotation direction; and applying minus current to the other exciting coil if the rotor is activated in a reverse rotation direction that is reverse to the forward rotation direction. Then, when the rotor is activated to be rotated, rectangular-wave current is preferably applied. Accordingly, acceleration or normal rotation can be provided.

Accordingly, with the DC brushless motor configured as described above, the SR motor which is not rotated by one phase can be activated, and when the rotation is started, the magnetic circuits for the two phases constantly contribute to the generation of a torque. Thus, space efficiency (output per size) can be increased.

Also, according to another aspect, the corresponding top and bottom magnetic poles are positioned to be shifted in the opposite directions in the circumferential direction by the same distance (angle) with respect to the center line of the corresponding middle magnetic pole.

Since the DC brushless motor configured as described above has even shifts, the torque can become almost uniform.

Also, according to another aspect, in the above-described DC brushless motor, the rotor is housed at an inner periphery side of the stator, and a ratio α of a circumferential length of a distal end of each of the protrusions of the rotor, in a cylindrical plane of a locus of the distal end of the protrusion of the rotor, (a ratio of a width in the circumferential direction of a distal end of each magnetic pole to a period of the magnetic pole; a ratio of total widths in the circumferential direction of the magnetic poles of the rotor to the entire circumference) meets 30%≤α≤55%.

With the DC brushless motor configured as described above, the ratio α of the circumferential length of the distal end of each protrusion, in a cylindrical plane of a locus of the distal end of the protrusion of the rotor, is equal to or higher than 30% and equal to or lower than 55% (i.e., the gap between the protrusions is 70% or lower and 45% or higher). Accordingly, the DC brushless motor configured as described above can generate a large torque.

Also, according to another aspect, in the above-described DC brushless motor, the exciting coils are each formed by winding a strip-shaped conductive member so that a width direction of the conductive member extends along a rotation axis direction of the exciting coil.

According to the DC brushless motor configured as described above, by forming the exciting coils as described above, eddy current that is generated at the exciting coils can be restricted, and heat generation can be restricted. Also, since the strip-shaped conductor member can be wound without a gap, with the DC brushless motor configured as described above, the current density can be increased and heat can be efficiently radiated from the inside of the conductor member, as compared with a case in which a cylindrical elemental wire is wound.

Also, according to another aspect, in the above-described DC brushless motor, the iron core members of the stator and the rotor are each formed of any of a powder magnetic core made of iron-base soft magnetic powder, a ferrite magnetic core, and a magnetic core made of a soft magnetic material in which soft magnetic alloy powder is dispersed in resin.

With the DC brushless motor configured as described above, the stator and the rotor can be molded into optimal complicated desirable shapes.

This application is based on Japanese Patent Application No. 2010-268396 filed Dec. 1, 2010, the content of which is incorporated by reference in this specification.

To express the present invention, while the present invention has been properly and sufficiently described through the embodiments with reference to the drawings, it is should be recognized that a person skilled in the art can easily modify and/or improve the embodiments. Therefore, the scope of the following claims is to be accorded the broadest interpretation so as to encompass a modified embodiment or an improved embodiment implemented by the person skilled in the art, unless the modified embodiment or the improved embodiment attains a level departing from the scope of the claims.

INDUSTRIAL APPLICABILITY

With the present invention, the DC brushless motor and the method for controlling the DC brushless motor can be provided.

The invention claimed is:

1. A switched-reluctance (SR) DC brushless motor, comprising:
a stator including ring-shaped exciting coils;
a rotor, which does not include a permanent magnet, provided coaxially to the stator; and
a driving circuit, which provides current to the ring-shaped exciting coils, including a switch element, which controls application of rectangular-wave current to the driving circuit, and each ring-shaped exciting coil having one respective selection switch element connected thereto,
wherein the stator includes
an iron core member having a substantially E-shaped cross-section in an axial direction at a radius part and having a plurality of protrusions, which serve as magnetic poles and are formed in a circumferential direction at each of three parallel sections of the E shape, and the ring-shaped exciting coils housed in two recesses of the E shape, said three parallel sections correspond to a top parallel section, a middle parallel section, and a bottom parallel section, and said plurality of protrusions include at least top protrusions formed on the top parallel section, and middle protrusions formed on the middle parallel section; wherein the rotor includes an iron core member having a plurality of protrusions, which serve as magnetic poles formed in the circumferential direction, each of said plurality of protrusions extending straight along an axial direction of the rotor;
wherein numbers of the magnetic poles at the three parallel sections of the E shape are equivalent,
wherein, from among the magnetic poles at the three parallel sections of the E shape, the corresponding top and bottom magnetic poles are positioned to be shifted in opposite directions in the circumferential direction with respect to a center line of the corresponding middle magnetic pole,
wherein a change in magnetic resistance between the stator and the rotor caused by a flow of a magnetic flux, which is generated around the ring-shaped exciting coils, is utilized as a driving force, and wherein a ratio "γ" of the stator in relation with a ratio "α" of the rotor meets the following mathematical relation, $$30\% \leq \gamma \leq \alpha$$

where the ratio "γ" is defined as a ratio of a sum of circumferential lengths of top protrusions of the stator with respect to a circumferential length of a circle drawn along the distal ends of the top protrusions of the stator; and the ratio "α" is defined as a ratio of a sum of circumferential lengths of the protrusions of the rotor with respect to a circumferential length of a circle drawn along the distal ends of the protrusions of the rotor,
the exciting coils are individually controlled by configuring the switch element and the selection switch elements to determine a forward or reverse direction of current applied to each ring-shaped exciting coil, and
a ratio "β" is defined as a ratio of a sum of circumferential lengths of middle protrusions of the stator with respect to a circumferential length of a circle drawn along the distal ends of the middle protrusions of the stator, such that β≤55%.

2. The DC brushless motor according to claim 1, wherein the corresponding top and bottom magnetic poles are positioned to be shifted in the opposite directions in the circumferential direction by the same distance with respect to the center line of the corresponding middle magnetic pole.

3. The DC brushless motor according to claim 1,
wherein the rotor is housed at an inner periphery side of the stator, and
wherein the ratio α meets 30%≤α≤55%.

4. The DC brushless motor according to claim 1, wherein the ring-shaped exciting coils are each formed by winding a strip-shaped conductive member so that a width direction of the conductive member extends along a rotation axis direction of the ring-shaped exciting coil.

5. The DC brushless motor according to claim 1, wherein the iron core members of the stator and the rotor are each formed of any of a powder magnetic core made of iron-base soft magnetic powder, a ferrite magnetic core, and a magnetic core made of a soft magnetic material in which soft magnetic alloy powder is dispersed in resin.

6. A method for controlling the DC brushless motor according to claim 1, comprising applying plus current to one of the two ring-shaped exciting coils if the rotor is activated in a forward rotation direction; and applying minus current to the other ring-shaped exciting coil if the rotor is activated in a reverse rotation direction that is reverse to the forward rotation direction.

7. The method for controlling the DC brushless motor according to claim 6, wherein the rotor is accelerated or normally rotated by applying the rectangular-wave current after the rotor is activated to be rotated.

8. A switched reluctance (SR) DC brushless motor, comprising:
a stator including ring-shaped exciting coils;
a rotor, which does not include a permanent magnet, provided coaxially to the stator; and
a driving circuit, which provides current to the ring-shaped exciting coils, including a switch element, which controls application of rectangular-wave current to the driving circuit, and each ring-shaped exciting coil having one respective selection switch element connected thereto,
wherein the stator includes
an iron core member having a substantially E-shaped cross-section in an axial direction at a radius part and having a plurality of protrusions, which serve as magnetic poles and are formed in a circumferential direction at each of three parallel sections of the E shape, and the ring-shaped exciting coils housed in two recesses of the E shape, said three parallel sections correspond to a top parallel section, a middle parallel section, and a bottom parallel section, and said plurality of protrusions include at least top protrusions formed on the top parallel section, and middle protrusions formed on the middle parallel section, such that a thickness of the middle protrusions is at least 1.5 times a thickness of the top protrusions; wherein the rotor includes an iron core member having a plurality of protrusions, which serve as magnetic poles formed in the circumferential direction, each of said plurality of protrusions extending straight along an axial direction of the rotor;
wherein a numbers of the magnetic poles at the three parallel sections of the E shape are equivalent,
wherein, from among the magnetic poles at the three parallel sections of the E shape, the corresponding top and bottom magnetic poles are positioned to be shifted in opposite directions in the circumferential direction with respect to a center line of the corresponding middle magnetic pole,
wherein the ring-shaped exciting coils are individually controlled by configuring the switch element and the selection switch elements to determine a forward or reverse direction of current applied to each ring-shaped exciting coil,
wherein a change in magnetic resistance between the stator and the rotor caused by a flow of a magnetic flux, which is generated around the ring-shaped exciting coils, is utilized as a driving force, and wherein a ratio "γ" of the stator in relation with a ratio "α" of the rotor meets the following mathematical relation, $30\% \leq \gamma \leq \alpha$ where the ratio "γ" is defined as a ratio of a sum of circumferential lengths of top protrusions of the stator with respect to a circumferential length of a circle drawn along the distal ends of the top protrusions of the stator; and the ratio "α" is defined as a ratio of a sum of circumferential lengths of the protrusions of the rotor with respect to a circumferential length of a circle drawn along the distal ends of the protrusions of the rotor.

* * * * *